United States Patent
Kantrowitz et al.

(12) 
(10) Patent No.: US 6,233,302 B1
(45) Date of Patent: May 15, 2001

(54) MOX FUEL ARRANGEMENT FOR NUCLEAR CORE

(75) Inventors: Mark L. Kantrowitz, Portland; Richard G. Rosenstein, Windsor, both of CT (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 09/343,548

(22) Filed: Jun. 30, 1999

Related U.S. Application Data

(62) Division of application No. 09/083,442, filed on May 22, 1998, and a continuation of application No. 08/749,795, filed on Nov. 15, 1996, now Pat. No. 5,822,388.

(51) Int. Cl.[7] .................................................. G21C 3/328
(52) U.S. Cl. .......................... 376/435; 376/170; 376/267; 376/419; 376/447
(58) Field of Search .................................... 376/170–173, 376/264, 267, 434, 435, 419, 447

(56) References Cited

U.S. PATENT DOCUMENTS

| | | | |
|---|---|---|---|
| 4,018,697 | * | 4/1977 | Smith ............................ 252/301.1 R |
| 4,302,289 | * | 11/1981 | Lindgren et al. ...................... 376/267 |
| 4,326,919 | * | 4/1982 | Hill ....................................... 376/267 |
| 5,089,210 | * | 2/1992 | Reese et al. .......................... 376/267 |
| 5,377,247 | * | 12/1994 | Yoshioka et al. ..................... 376/428 |
| 5,410,580 | * | 4/1995 | Seino .................................... 376/435 |
| 5,412,701 | * | 5/1995 | Glazman et al. ..................... 376/419 |
| 5,416,813 | * | 5/1995 | Hiraiwa et al. ...................... 376/419 |
| 5,440,598 | * | 8/1995 | Reese et al. .......................... 376/435 |
| 5,822,388 | * | 10/1998 | Kantrowitz et al. ................. 376/435 |

FOREIGN PATENT DOCUMENTS

| | | | | |
|---|---|---|---|---|
| 1107409 | * | 8/1981 | (CA) | ..................................... 376/267 |
| 2920304 | * | 12/1979 | (DE) | ..................................... 376/267 |
| 4321468 | * | 2/1994 | (DE) | ..................................... 376/434 |
| 437334 | * | 3/1992 | (EP) | ..................................... 376/435 |
| 63-293489 | * | 11/1988 | (JP) | ..................................... 376/435 |
| 63-293493 | * | 11/1988 | (JP) | ..................................... 376/435 |
| 4-109193 | * | 4/1992 | (JP) | ..................................... 376/435 |
| 4-303796 | * | 10/1992 | (JP) | ..................................... 376/435 |
| 5-1729976 | * | 7/1993 | (JP) | ..................................... 376/267 |

OTHER PUBLICATIONS

Hanson et al, Plutonium in the Thermal Fuel Cycle—II, Transactions of the American Nuclear Society, vol. 17, pp. 296–299, Sep. 1973.*

* cited by examiner

*Primary Examiner*—Charles T. Jordan
*Assistant Examiner*—Jack Keith
(74) *Attorney, Agent, or Firm*—Rader, Fishman & Grauer

(57) ABSTRACT

In order to use up a stockpile of weapons-grade plutonium, the plutonium is converted into a mixed oxide (MOX) fuel form wherein it can be disposed in a plurality of different fuel assembly types. Depending on the equilibrium cycle that is required, a predetermined number of one or more of the fuel assembly types are selected and arranged in the core of the reactor in accordance with a selected loading schedule. Each of the fuel assemblies is designed to produce different combustion characteristics whereby the appropriate selection and disposition in the core enables the resulting equilibrium cycle to closely resemble that which is produced using urania fuel. The arrangement of the MOX rods and burnable absorber rods within each of the fuel assemblies, in combination with a selective control of the amount of plutonium which is contained in each of the MOX rods, is used to tailor the combustion characteristics of the assembly.

6 Claims, 37 Drawing Sheets

FIG. 2A
PRIOR ART
FIG. 2B
PRIOR ART
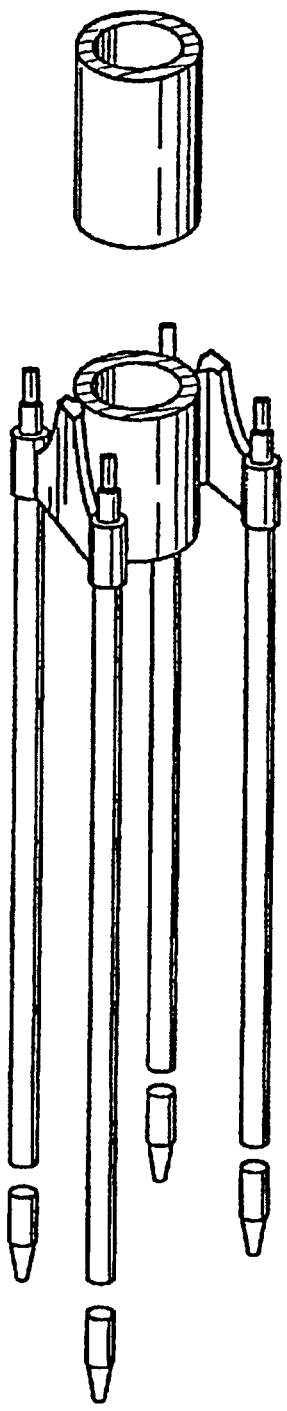
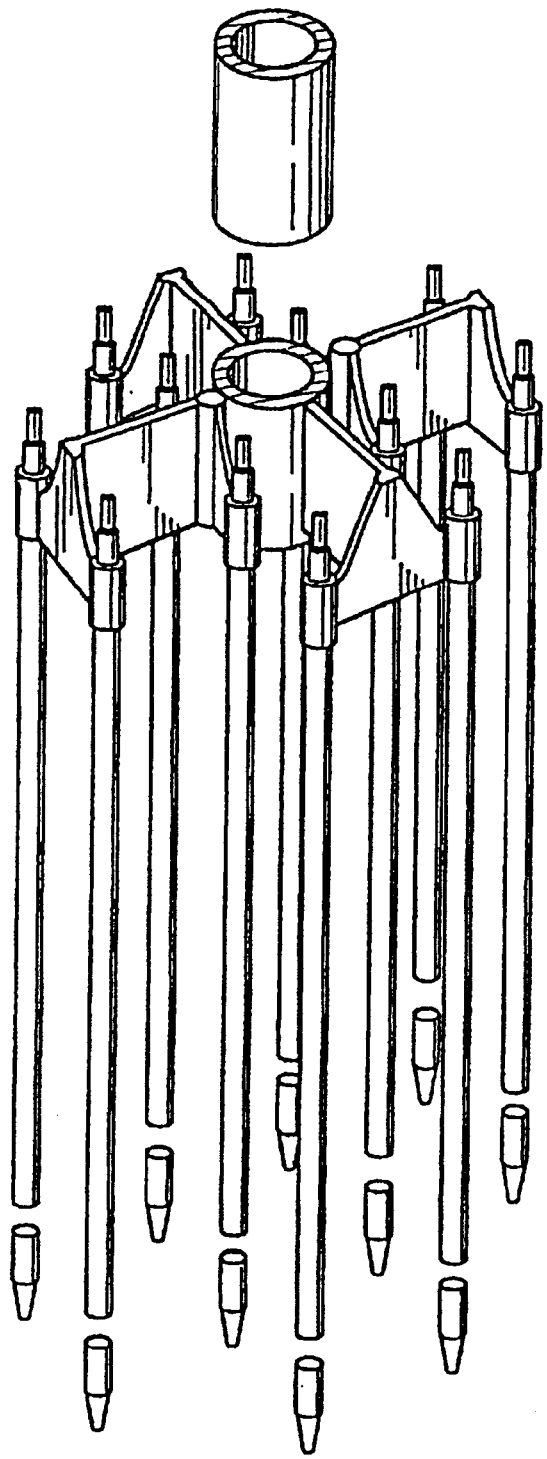

| | | | | | | 34 E 0.642 | 35 E 0.704 |
|---|---|---|---|---|---|---|---|
| | | | | | 31 4.2 1.065 | 32 4.8 1.094 | 33 4.8 1.095 |
| | | | | 27 | 28 3.3 1.041 | 29 4.8 1.059 | 30 4.8 1.000 |
| | | | 22 | 23 | 24 3.3 1.035 | 25 4.8 1.044 | 26 4.8 0.975 |
| | | 16 4.2 1.064 | 17 3.3 1.047 | 18 3.3 1.041 | 19 4.5 1.084 | 20 4.8 1.022 | 21 4.8 0.968 |
| | 9 E 0.585 | 10 4.8 1.076 | 11 4.8 1.081 | 12 4.8 1.073 | 13 4.8 1.045 | 14 E 0.552 | 15 4.8 0.992 |
| 1 3.6 0.998 | 2 4.2 1.043 | 3 4.8 1.069 | 4 4.8 1.054 | 5 4.8 1.046 | 6 4.8 1.035 | 7 4.8 1.036 | 8 4.8 1.012 |

FIG. 5C

| | | | | | | | | |
|---|---|---|---|---|---|---|---|---|
| | | | | | | | | 36 |
| | | | | | | 34 E 0.687 | 35 E 0.759 | |
| | | | | | 31 5.2 1.061 | 32 5.8 1.076 | 33 5.8 1.081 | |
| | | | | | 28 4.3 1.082 | 29 5.8 1.039 | 30 5.8 0.985 | |
| | | | | 22 | 24 4.3 1.077 | 25 5.8 1.024 | 26 5.8 0.962 | |
| | | 16 5.2 1.059 | 17 4.3 1.089 | 18 4.3 1.083 | 19 5.5 1.072 | 20 5.8 1.006 | 21 5.8 0.956 | |
| | 9 E 0.622 | 10 5.8 1.056 | 11 5.8 1.060 | 12 5.8 1.053 | 13 5.8 1.030 | 14 E 0.589 | 15 5.8 0.981 | |
| 1 4.6 1.014 | 2 5.2 1.040 | 3 5.8 1.053 | 4 5.8 1.040 | 5 5.8 1.033 | 6 5.8 1.024 | 7 5.8 1.026 | 8 5.8 1.003 | |

| | | | | | | | |
|---|---|---|---|---|---|---|---|
| | | | | | | | 36 |
| | | | | | | 34 E 0.654 | 35 E 0.716 |
| | | | | | 31 4.2 1.083 | 32 4.5 1.075 | 33 4.5 1.077 |
| | | | | 27 | 28 3.3 1.054 | 29 4.8 1.076 | 30 4.8 1.017 |
| | | | 22 | 23 | 24 3.3 1.047 | 25 4.8 1.058 | 26 4.8 0.990 |
| | | 16 4.2 1.076 | 17 3.3 1.058 | 18 3.3 1.053 | 19 4.5 1.099 | 20 4.8 1.041 | 21 4.8 0.991 |
| | 9 E 0.595 | 10 4.8 1.090 | 11 4.8 1.093 | 12 4.8 1.086 | 13 4.8 1.065 | 14 E 0.570 | 15 4.8 1.060 |
| 1 3.6 1.017 | 2 3.9 1.019 | 3 4.8 1.085 | 4 4.8 1.067 | 5 4.8 1.061 | 6 4.8 1.061 | 7 4.5 1.071 | 8 E 0.611 |

FIG. 6C

| | | | | | | | 36 |
|---|---|---|---|---|---|---|---|
| | | | | | | 34 E 0.697 | 35 E 0.769 |
| | | | | | 31 5.2 1.074 | 32 5.5 1.061 | 33 5.5 1.067 |
| | | | | | 28 4.3 1.093 | 29 5.8 1.051 | 30 5.8 0.998 |
| | | | 22 | | 24 4.3 1.087 | 25 5.8 1.035 | 26 5.8 0.974 |
| | | 16 5.2 1.068 | 17 4.3 1.098 | 18 4.3 1.092 | 19 5.5 1.083 | 20 5.8 1.022 | 21 5.8 0.976 |
| | 9 E 0.629 | 10 5.8 1.067 | 11 5.8 1.069 | 12 5.8 1.064 | 13 5.8 1.046 | 14 E 0.607 | 15 5.8 1.046 |
| 1 4.6 1.030 | 2 4.9 1.022 | 3 5.8 1.065 | 4 5.8 1.050 | 5 5.8 1.045 | 6 5.8 1.046 | 7 5.5 1.065 | 8 E 0.653 |

| | | | | | | | |
|---|---|---|---|---|---|---|---|
| | | | | | | | 36 |
| | | | | | | 34<br>3.9<br>1.079 | 35<br>E<br>0.707 |
| | | | | | 31<br>3.6<br>1.064 | 32<br>4.5<br>1.088 | 33<br>4.5<br>1.082 |
| | | | | 27 | 28<br>E<br>0.750 | 29<br>4.2<br>1.059 | 30<br>4.8<br>1.041 |
| | | | 22 | 23 | 24<br>E<br>0.745 | 25<br>4.5<br>1.082 | 26<br>4.8<br>1.011 |
| | | 16<br>3.6<br>1.057 | 17<br>E<br>0.752 | 18<br>E<br>0.750 | 19<br>3.6<br>1.040 | 20<br>4.8<br>1.049 | 21<br>4.8<br>0.985 |
| | 9<br>4.8<br>1.078 | 10<br>4.8<br>1.101 | 11<br>4.2<br>1.077 | 12<br>4.2<br>1.071 | 13<br>4.8<br>1.076 | 14<br>4.8<br>1.011 | 15<br>4.8<br>0.984 |
| 1<br>3.6<br>1.002 | 2<br>4.2<br>1.033 | 3<br>4.8<br>1.087 | 4<br>4.8<br>1.093 | 5<br>4.8<br>1.085 | 6<br>4.8<br>1.055 | 7<br>4.8<br>1.029 | 8<br>4.8<br>1.016 |

FIG. 7C

|  |  |  |  |  |  |  | 36 |
|---|---|---|---|---|---|---|---|
|  |  |  |  |  |  | 34<br>4.9<br>1.087 | 35<br>E'<br>0.756 |
|  |  |  |  |  | 31<br>4.6<br>1.085 | 32<br>5.5<br>1.070 | 33<br>5.5<br>1.068 |
|  |  |  |  |  | 28<br>E'<br>0.804 | 29<br>5.2<br>1.055 | 30<br>5.8<br>1.020 |
|  |  |  | 22 |  | 24<br>E'<br>0.800 | 25<br>5.5<br>1.071 | 26<br>5.8<br>0.993 |
|  |  | 16<br>4.6<br>1.080 | 17<br>E'<br>0.807 | 18<br>E'<br>0.804 | 19<br>4.6<br>1.064 | 20<br>5.8<br>1.029 | 21<br>5.8<br>0.969 |
|  | 9<br>5.8<br>1.054 | 10<br>5.8<br>1.078 | 11<br>5.2<br>1.074 | 12<br>5.2<br>1.069 | 13<br>5.8<br>1.055 | 14<br>5.8<br>0.994 | 15<br>5.8<br>0.969 |
| 1<br>4.6<br>1.014 | 2<br>5.2<br>1.027 | 3<br>5.8<br>1.066 | 4<br>5.8<br>1.074 | 5<br>5.8<br>1.067 | 6<br>5.8<br>1.039 | 7<br>5.8<br>1.015 | 8<br>5.8<br>1.004 |

| | | | | | | | | |
|---|---|---|---|---|---|---|---|---|
| | | | | | | | | 36 |
| | | | | | | | 34<br>3.6<br>1.062 | 35<br>E<br>0.721 |
| | | | | | | 31<br>E<br>0.695 | 32<br>4.2<br>1.095 | 33<br>4.5<br>1.107 |
| | | | | | 27 | 28<br>E<br>0.774 | 29<br>4.2<br>1.088 | 30<br>4.8<br>1.060 |
| | | | | 22 | 23 | 24<br>E<br>0.760 | 25<br>4.5<br>1.100 | 26<br>4.8<br>1.025 |
| | | 16<br>E<br>0.697 | 17<br>E<br>0.781 | 18<br>E<br>0.766 | 19<br>3.6<br>1.058 | 20<br>4.8<br>1.064 | 21<br>4.8<br>0.997 |
| | 9<br>4.5<br>1.096 | 10<br>4.2<br>1.087 | 11<br>3.9<br>1.074 | 12<br>4.2<br>1.096 | 13<br>4.8<br>1.092 | 14<br>4.8<br>1.023 | 15<br>4.8<br>0.994 |
| 1<br>3.3<br>0.994 | 2<br>3.9<br>1.036 | 3<br>4.5<br>1.096 | 4<br>4.5<br>1.091 | 5<br>4.8<br>1.109 | 6<br>4.8<br>1.070 | 7<br>4.8<br>1.041 | 8<br>4.8<br>1.027 |

FIG. 8C

| | | | | | | | | |
|---|---|---|---|---|---|---|---|---|
| | | | | | | | | 36 |
| | | | | | | | 34<br>4.6<br>1.079 | 35<br>E<br>0.769 |
| | | | | | | 31<br>E<br>0.738 | 32<br>5.2<br>1.085 | 33<br>5.5<br>1.090 |
| | | | | | | 28<br>E<br>0.829 | 29<br>5.2<br>1.082 | 30<br>5.8<br>1.035 |
| | | | | 22 | | 24<br>E<br>0.813 | 25<br>5.5<br>1.086 | 26<br>5.8<br>1.004 |
| | | 16<br>E<br>0.739 | 17<br>E<br>0.835 | 18<br>E<br>0.819 | 19<br>4.6<br>1.079 | 20<br>5.8<br>1.041 | 21<br>5.8<br>0.978 |
| | 9<br>5.5<br>1.071 | 10<br>5.2<br>1.075 | 11<br>4.9<br>1.076 | 12<br>5.2<br>1.089 | 13<br>5.8<br>1.068 | 14<br>5.8<br>1.003 | 15<br>5.8<br>0.977 |
| 1<br>4.3<br>1.010 | 2<br>4.9<br>1.029 | 3<br>5.5<br>1.074 | 4<br>5.5<br>1.072 | 5<br>5.8<br>1.085 | 6<br>5.8<br>1.050 | 7<br>5.8<br>1.024 | 8<br>5.8<br>1.012 |

| | | | | | | | |
|---|---|---|---|---|---|---|---|
| | | | | | | | 36 |
| | | | | | | 34<br>3.3<br>1.037 | 35<br>E<br>0.738 |
| | | | | | 31<br>E<br>0.713 | 32<br>3.9<br>1.082 | 33<br>4.2<br>1.095 |
| | | | | 27 | 28<br>E<br>0.793 | 29<br>3.9<br>1.072 | 30<br>4.8<br>1.088 |
| | | | 22 | 23 | 24<br>E<br>0.786 | 25<br>4.2<br>1.092 | 26<br>4.8<br>1.049 |
| | | 16<br>E<br>0.707 | 17<br>E<br>0.795 | 18<br>E<br>0.791 | 19<br>E<br>0.691 | 20<br>4.8<br>1.111 | 21<br>4.8<br>1.017 |
| | 9<br>4.5<br>1.097 | 10<br>4.2<br>1.097 | 11<br>3.9<br>1.093 | 12<br>3.9<br>1.082 | 13<br>4.5<br>1.102 | 14<br>4.8<br>1.050 | 15<br>4.8<br>1.010 |
| 1<br>3.6<br>1.033 | 2<br>4.2<br>1.075 | 3<br>4.5<br>1.102 | 4<br>4.5<br>1.108 | 5<br>4.5<br>1.095 | 6<br>4.8<br>1.096 | 7<br>4.8<br>1.058 | 8<br>4.8<br>1.040 |

FIG. 9C

| | | | | | | | |
|---|---|---|---|---|---|---|---|
| | | | | | | | 36 |
| | | | | | | 34<br>4.3<br>1.062 | 35<br>E<br>0.783 |
| | | | | | 31<br>E<br>0.754 | 32<br>4.9<br>1.076 | 33<br>5.2<br>1.080 |
| | | | | | 28<br>E<br>0.846 | 29<br>4.9<br>1.071 | 30<br>5.8<br>1.057 |
| | | | 22 | | 24<br>E<br>0.840 | 25<br>5.2<br>1.024 | 26<br>5.8<br>1.023 |
| | 16<br>E<br>0.748 | 17<br>E<br>0.849 | 18<br>E<br>0.845 | 19<br>E<br>0.733 | 20<br>5.8<br>1.086 | 21<br>5.8<br>0.995 | |
| 9<br>5.5<br>1.072 | 10<br>5.2<br>1.084 | 11<br>4.9<br>1.093 | 12<br>4.9<br>1.084 | 13<br>5.5<br>1.085 | 14<br>5.8<br>1.028 | 15<br>5.8<br>0.991 | |
| 1<br>4.6<br>1.039 | 2<br>5.2<br>1.059 | 3<br>5.5<br>1.079 | 4<br>5.5<br>1.086 | 5<br>5.5<br>1.075 | 6<br>5.8<br>1.072 | 7<br>5.8<br>1.039 | 8<br>5.8<br>1.023 |

| | | | | | | | 36 |
|---|---|---|---|---|---|---|---|
| | | | | | | 34<br>3.3<br>1.050 | 35<br>E<br>0.747 |
| | | | | | 31<br>E<br>0.723 | 32<br>3.9<br>1.096 | 33<br>4.2<br>1.109 |
| | | | | 27 | 28<br>E<br>0.805 | 29<br>3.9<br>1.090 | 30<br>4.8<br>1.104 |
| | | | 22 | 23 | 24<br>E<br>0.800 | 25<br>3.9<br>1.067 | 26<br>4.8<br>1.068 |
| | | 16<br>E<br>0.740 | 17<br>E<br>0.820 | 18<br>E<br>0.810 | 19<br>E<br>0.706 | 20<br>4.5<br>1.096 | 21<br>4.8<br>1.036 |
| | 9<br>E<br>0.668 | 10<br>3.6<br>1.084 | 11<br>3.6<br>1.095 | 12<br>3.6<br>1.071 | 13<br>4.2<br>1.091 | 14<br>4.8<br>0.074 | 15<br>4.8<br>1.028 |
| 1<br>3.3<br>1.058 | 2<br>3.6<br>1.078 | 3<br>3.9<br>1.094 | 4<br>3.9<br>1.081 | 5<br>4.2<br>1.100 | 6<br>4.5<br>1.092 | 7<br>4.8<br>1.081 | 8<br>4.8<br>1.057 |

FIG. 10C

| | | | | | | | |
|---|---|---|---|---|---|---|---|
| | | | | | | | 36 |
| | | | | | | 34<br>4.3<br>1.073 | 35<br>E<br>0.790 |
| | | | | | 31<br>E<br>0.762 | 32<br>4.9<br>1.087 | 33<br>5.2<br>1.091 |
| | | | | | 28<br>E<br>0.856 | 29<br>4.9<br>1.085 | 30<br>5.8<br>1.069 |
| | | | 22 | | 24<br>E<br>0.852 | 25<br>4.9<br>1.065 | 26<br>5.8<br>1.037 |
| | | 16<br>E<br>0.776 | 17<br>E<br>0.869 | 18<br>E<br>0.861 | 19<br>E<br>0.746 | 20<br>5.5<br>1.074 | 21<br>5.8<br>1.009 |
| | 9<br>E<br>0.692 | 10<br>4.6<br>1.082 | 11<br>4.6<br>1.096 | 12<br>4.6<br>1.076 | 13<br>5.2<br>1.076 | 14<br>5.8<br>1.046 | 15<br>5.8<br>1.003 |
| 1<br>4.3<br>1.063 | 2<br>4.6<br>1.071 | 3<br>4.9<br>1.075 | 4<br>4.9<br>1.065 | 5<br>5.2<br>1.078 | 6<br>5.5<br>1.068 | 7<br>5.8<br>1.056 | 8<br>5.8<br>1.035 |

| | | | | | | | |
|---|---|---|---|---|---|---|---|
| | | | | | | 36 | |
| | | | | | | 34 E 0.731 | 35 E 0.785 |
| | | | | | 31 E 0.748 | 32 3.3 1.052 | 33 3.6 1.068 |
| | | | | 27 | 28 E 0.821 | 29 3.6 1.073 | 30 4.5 1.104 |
| | | | 22 | 23 | 24 E 0.811 | 25 3.9 1.087 | 26 4.8 1.088 |
| | | 16 E 0.748 | 17 E 0.829 | 18 E 0.819 | 19 E 0.714 | 20 4.5 1.107 | 21 4.8 1.048 |
| | 9 E 0.674 | 10 3.6 1.098 | 11 3.3 1.052 | 12 3.6 1.084 | 13 4.2 1.101 | 14 4.8 0.083 | 15 4.8 1.036 |
| 1 3.3 1.067 | 2 3.6 1.088 | 3 3.9 1.106 | 4 3.9 1.094 | 5 4.2 1.111 | 6 4.5 1.101 | 7 4.8 1.090 | 8 4.8 1.065 |

FIG. 11C

| | | | | | | 34<br>E<br>0.764 | 35<br>E<br>0.828 | 36 |
|---|---|---|---|---|---|---|---|---|
| | | | | | 31<br>E<br>0.784 | 32<br>4.3<br>1.066 | 33<br>4.6<br>1.067 | |
| | | | | | 28<br>E<br>0.870 | 29<br>4.6<br>1.075 | 30<br>5.5<br>1.069 | |
| | | | | 22 | 24<br>E<br>0.860 | 25<br>4.9<br>1.080 | 26<br>5.8<br>1.052 | |
| | | 16<br>E<br>0.782 | 17<br>E<br>0.876 | 18<br>E<br>0.868 | 19<br>E<br>0.752 | 20<br>5.5<br>1.083 | 21<br>5.8<br>1.017 | |
| | 9<br>E<br>0.714 | 10<br>4.6<br>1.092 | 11<br>4.3<br>1.065 | 12<br>4.6<br>1.086 | 13<br>5.2<br>1.083 | 14<br>5.8<br>1.052 | 15<br>5.8<br>1.009 | |
| 1<br>4.3<br>1.070 | 2<br>4.6<br>1.078 | 3<br>4.9<br>1.084 | 4<br>4.9<br>1.075 | 5<br>5.2<br>1.087 | 6<br>5.5<br>1.074 | 7<br>5.8<br>1.062 | 8<br>5.8<br>1.041 | |

| | | | | | | | |
|---|---|---|---|---|---|---|---|
| | | | | | | | 36 |
| | | | | | | 34 E 0.747 | 35 E 0.801 |
| | | | | | 31 E 0.766 | 32 3.3 1.078 | 33 3.6 1.095 |
| | | | | 27 | 28 E 0.843 | 29 3.6 1.107 | 30 4.2 1.098 |
| | | | 22 | 23 | 24 E 0.838 | 25 3.6 1.081 | 26 4.5 1.097 |
| | 16 E 0.775 | 17 E 0.856 | 18 E 0.849 | 19 E 0.748 | 20 3.9 1.097 | 21 4.8 1.111 |
| 9 E 0.704 | 10 3.3 1.087 | 11 3.3 1.100 | 12 3.3 1.084 | 13 3.6 1.091 | 14 E 0.639 | 15 4.5 1.085 |
| 1 3.15 1.084 | 2 3.3 1.083 | 3 3.6 1.108 | 4 3.6 1.099 | 5 3.6 1.082 | 6 3.9 1.097 | 7 4.2 1.108 | 8 4.5 0.102 |

FIG. 12C

| | | | | | | 34<br>E<br>0.776 | 35<br>E<br>0.840 | 36 |
|---|---|---|---|---|---|---|---|---|
| | | | | | 31<br>E<br>0.798 | 32<br>4.3<br>1.086 | 33<br>4.6<br>1.087 | |
| | | | | | 28<br>E<br>0.887 | 29<br>4.6<br>1.101 | 30<br>5.2<br>1.064 | |
| | | | 22 | | 24<br>E<br>0.882 | 25<br>4.6<br>1.078 | 26<br>5.5<br>1.058 | |
| | | 16<br>E<br>0.803 | 17<br>E<br>0.898 | 18<br>E<br>0.892 | 19<br>E<br>0.781 | 20<br>4.9<br>1.081 | 21<br>5.8<br>1.067 | |
| | 9<br>E<br>0.720 | 10<br>4.3<br>1.085 | 11<br>4.3<br>1.101 | 12<br>4.3<br>1.089 | 13<br>4.6<br>1.083 | 14<br>E<br>0.664 | 15<br>5.5<br>1.053 | |
| 1<br>4.15<br>1.084 | 2<br>4.3<br>1.075 | 3<br>4.6<br>1.086 | 4<br>4.6<br>1.080 | 5<br>4.6<br>1.066 | 6<br>4.9<br>1.074 | 7<br>5.2<br>1.082 | 8<br>5.5<br>1.071 | |

| | | | | | | | 36 |
|---|---|---|---|---|---|---|---|
| | | | | | | 34 E 0.771 | 35 E 0.825 |
| | | | | | 31 E 0.792 | 32 3.15 1.088 | 33 3.3 1.083 |
| | | | | 27 | 28 E 0.872 | 29 3.3 1.099 | 30 3.9 1.106 |
| | | | 22 | 23 | 24 E 0.871 | 25 3.3 1.095 | 26 4.2 1.122 |
| | | 16 E 0.801 | 17 E 0.885 | 18 E 0.879 | 19 E 0.787 | 20 E 0.704 | 21 4.2 1.116 |
| | 9 E 0.731 | 10 3.15 1.100 | 11 3.0 1.082 | 12 3.15 1.102 | 13 3.3 1.092 | 14 E 0.680 | 15 4.2 1.110 |
| 1 3.0 1.096 | 2 3.15 1.096 | 3 3.3 1.100 | 4 3.3 1.096 | 5 3.3 1.079 | 6 3.6 1.102 | 7 3.9 1.120 | 8 4.2 1.116 |

FIG. 13C

| | | | | | | | |
|---|---|---|---|---|---|---|---|
| | | | | | | | 36 |
| | | | | | | 34 E 0.795 | 35 E 0.859 |
| | | | | | 31 E 0.817 | 32 4.15 1.095 | 33 4.3 1.079 |
| | | | | | 28 E 0.910 | 29 4.3 1.097 | 30 4.9 1.070 |
| | | | | 22 | 24 E 0.910 | 25 4.3 1.098 | 26 5.2 1.079 |
| | 16 E 0.823 | 17 E 0.920 | 18 E 0.916 | 19 E 0.815 | 20 E 0.726 | 21 5.2 1.079 |
| 9 E 0.740 | 10 4.15 1.096 | 11 4.0 1.090 | 12 4.15 1.104 | 13 4.3 1.089 | 14 E 0.700 | 15 5.2 1.075 |
| 1 4.0 1.093 | 2 4.15 1.085 | 3 4.3 1.080 | 4 4.3 1.078 | 5 4.3 1.065 | 6 4.6 1.079 | 7 4.9 1.092 | 8 5.2 1.082 |

| | | | | | | | |
|---|---|---|---|---|---|---|---|
| | | | | | | | 36 |
| | | | | | 34 E 0.786 | 35 E 0.839 | |
| | | | | | 31 E 0.808 | 32 3.0 1.080 | 33 3.3 1.106 |
| | | | | 27 | 28 E 0.889 | 29 3.15 1.096 | 30 3.9 1.138 |
| | | | 22 | 23 | 24 E 0.890 | 25 3.15 1.100 | 26 3.9 1.123 |
| | | 16 E 0.813 | 17 E 0.899 | 18 E 0.896 | 19 E 0.808 | 20 E 0.735 | 21 3.6 1.105 |
| | 9 E 0.741 | 10 3.15 1.115 | 11 3.0 1.101 | 12 3.0 1.095 | 13 3.15 1.097 | 14 E 0.720 | 15 E 0.704 |
| 1 3.0 1.110 | 2 3.15 1.110 | 3 3.3 1.115 | 4 3.3 1.113 | 5 3.3 1.103 | 6 3.6 1.138 | 7 3.6 1.131 | 8 3.6 1.122 |

FIG. 14C

| 1<br>4.0<br>1.103 | 2<br>4.15<br>1.095 | 3<br>4.3<br>1.091 | 4<br>4.3<br>1.090 | 5<br>4.3<br>1.082 | 6<br>4.6<br>1.106 | 7<br>4.6<br>1.106 | 8<br>4.6<br>1.100 |
|---|---|---|---|---|---|---|---|
| 9<br>E<br>0.740 | 10<br>4.15<br>1.107 | 11<br>4.0<br>1.104 | 12<br>4.0<br>1.100 | 13<br>4.15<br>1.097 | 14<br>E<br>0.736 | 15<br>E<br>0.721 | |
| | 16<br>E<br>0.832 | 17<br>E<br>0.931 | 18<br>E<br>0.929 | 19<br>E<br>0.832 | 20<br>E<br>0.752 | 21<br>4.6<br>1.083 | |
| | | | | 24<br>E<br>0.925 | 25<br>4.15<br>1.104 | 26<br>4.9<br>1.081 | |
| | | | | 28<br>E<br>0.923 | 29<br>4.15<br>1.096 | 30<br>4.9<br>1.093 | |
| | | | | 31<br>E<br>0.830 | 32<br>4.0<br>1.090 | 33<br>4.3<br>1.096 | |
| | | | | | 34<br>E<br>0.806 | 35<br>E<br>0.869 | |
| | | | | | | | 36 |

FIG. 15

|    |    |    |    |    | Y0 | Z0 | Y0 | Z4 | Y0 | Z0 | Y0 |    |    |    |    |    |
|----|----|----|----|----|----|----|----|----|----|----|----|----|----|----|----|----|
|    |    |    | Z4 | Y0 | X0 | Y4 | X0 | Y4 | X0 | Y4 | X0 | Y0 | Z4 |    |    |    |
|    |    | Z4 | X0 | Y4 | Z0 | X4 | Z4 | X4 | Z4 | X4 | Z0 | Y4 | X0 | Z4 |    |    |
|    |    | Z4 | X0 | X4 | Z4 | X4 | Z4 | X4 | Z4 | X4 | Z4 | X4 | X0 | Z4 |    |    |
|    |    | Y0 | Y4 | Z4 | X4 | Y4 | X4 | Z0 | Y4 | Z0 | X4 | Y4 | X4 | Z4 | Y4 | Y0 |
| Y0 | X0 | Z0 | X4 | Y4 | Y4 | Z4 | X4 | Y4 | X4 | Z4 | Y4 | Y4 | X4 | Z0 | X0 | Y0 |
| Z0 | Y4 | X4 | Z4 | X4 | Z4 | Y4 | Y4 | X4 | Y4 | Y4 | Z4 | X4 | Z4 | X4 | Y4 | Z0 |
| Y0 | X0 | Z4 | X4 | Z0 | X4 | Y4 | Y4 | Z4 | Y4 | Y4 | X4 | Z0 | X4 | Z4 | X0 | Y0 |
| Z4 | Y4 | X4 | Z4 | Y4 | Y4 | X4 | Z4 | X0 | Z4 | X4 | Y4 | Y4 | Z4 | X4 | Y4 | Z4 |
| Y0 | X0 | Z4 | X4 | Z0 | X4 | Y4 | Y4 | Z4 | Y4 | Y4 | X4 | Z0 | X4 | Z4 | X0 | Y0 |
| Z0 | Y4 | X4 | Z4 | X4 | Z4 | Y4 | Y4 | X4 | Y4 | Y4 | Z4 | X4 | Z4 | X4 | Y4 | Z0 |
| Y0 | X0 | Z0 | X4 | Y4 | Y4 | Z4 | X4 | Y4 | X4 | Z4 | Y4 | Y4 | X4 | Z0 | X0 | Y0 |
|    |    | Y0 | Y4 | Z4 | X4 | Y4 | X4 | Z0 | Y4 | Z0 | X4 | Y4 | X4 | Z4 | Y4 | Y0 |
|    |    | Z4 | X0 | X4 | Z4 | X4 | Z4 | X4 | Z4 | X4 | Z4 | X4 | X0 | Z4 |    |    |
|    |    | Z4 | X0 | Y4 | Z0 | X4 | Z4 | X4 | Z4 | X4 | Z0 | Y4 | X0 | Z4 |    |    |
|    |    |    | Z4 | Y0 | X0 | Y4 | X0 | Y4 | X0 | Y4 | X0 | Y0 | Z4 |    |    |    |
|    |    |    |    |    | Y0 | Z0 | Y0 | Z4 | Y0 | Z0 | Y0 |    |    |    |    |    |

FIG. 16

|    |    |    | Z7 | Y4 | Y0 | Z4 | Y0 | Y4 | Z7 |    |    |    |
|----|----|----|----|----|----|----|----|----|----|----|----|----|
|    |    | Z7 | Y7 | X0 | Y0 | X0 | Y7 | X0 | Y0 | X0 | Y7 | Z7 |
|    |    | Y4 | Y4 | X4 | Z4 | X4 | Z4 | X7 | Z4 | X4 | Z4 | X4 | Y4 | Y4 |
|    | Z7 | Y4 | X4 | Z0 | X7 | Z0 | X7 | Y7 | X7 | Z0 | X7 | Z0 | X4 | Y4 | Z7 |
|    | Y7 | X4 | Z0 | X4 | Y7 | X7 | Z7 | Y4 | Z7 | X7 | Y7 | X4 | Z0 | X4 | Y7 |
| Z7 | X0 | Z4 | X7 | Y7 | Y4 | Z4 | X4 | Z4 | X4 | Z4 | Y4 | Y7 | X7 | Z4 | X0 | Z7 |
| Y4 | Y0 | X4 | Z0 | X7 | Z4 | Y7 | Y4 | X4 | Y4 | Y7 | Z4 | X7 | Z0 | X4 | Y0 | Y4 |
| Y0 | X0 | Z4 | X7 | Z7 | X4 | Y4 | Z4 | Z7 | Z4 | Y4 | X4 | Z7 | X7 | Z4 | X0 | Y0 |
| Z4 | Y7 | X7 | Y7 | Y4 | Z4 | X4 | Z7 | X0 | Z7 | X4 | Z4 | Y4 | Y7 | X7 | Y7 | Z4 |
| Y0 | X0 | Z4 | X7 | Z7 | X4 | Y4 | Z4 | Z7 | Z4 | Y4 | X4 | Z7 | X7 | Z4 | X0 | Y0 |
| Y4 | Y0 | X4 | Z0 | X7 | Z4 | Y7 | Y4 | X4 | Y4 | Y7 | Z4 | X7 | Z0 | X4 | Y0 | Y4 |
| Z7 | X0 | Z4 | X7 | Y7 | Y4 | Z4 | X4 | Z4 | X4 | Z4 | Y4 | Y7 | X7 | Z4 | X0 | Z7 |
|    | Y7 | X4 | Z0 | X4 | Y7 | X7 | Z7 | Y4 | Z7 | X7 | Y7 | X4 | Z0 | X4 | Y7 |
|    | Z7 | Y4 | X4 | Z0 | X7 | Z0 | X7 | Y7 | X7 | Z0 | X7 | Z0 | X4 | Y4 | Z7 |
|    |    | Y4 | Y4 | X4 | Z4 | X4 | Z4 | X7 | Z4 | X4 | Z4 | X4 | Y4 | Y4 |
|    |    | Z7 | Y7 | X0 | Y0 | X0 | Y7 | X0 | Y0 | X0 | Y7 | Z7 |
|    |    |    | Z7 | Y4 | Y0 | Z4 | Y0 | Y4 | Z7 |

FIG. 17

|    |    |    | Y3 | Z3 | Y3 | Z3 | Y3 | Z3 | Y3 |    |    |    |
|----|----|----|----|----|----|----|----|----|----|----|----|----|
|    |    | Z4 | Y3 | X3 | Y3 | X3 | Y3 | X3 | Y3 | X3 | Y3 | Z4 |
|    | Y4 | Y3 | X3 | Z3 | X3 | Y3 | X3 | Y3 | X3 | Z3 | X3 | Y3 | Y4 |
|    | Z4 | Y3 | X3 | Y3 | X3 | Z3 | X3 | Y5 | X3 | Z3 | X3 | Y3 | X3 | Y3 | Z4 |
|    | Y3 | X3 | Y3 | X4 | Z3 | X3 | Z3 | Y5 | Z3 | X3 | Z3 | X4 | Y3 | X3 | Y3 |
| Y3 | X3 | Z3 | X3 | Z3 | Y3 | Z3 | X4 | Z3 | X4 | Z3 | Y3 | Z3 | X3 | Z3 | X3 | Y3 |
| Z3 | Y3 | X3 | Z3 | X3 | Z3 | X5 | Y4 | X5 | Y4 | X5 | Z3 | X3 | Z3 | X3 | Y3 | Z3 |
| Y3 | X3 | Y3 | X3 | Z3 | X4 | Y4 | X5 | Y5 | X5 | Y4 | X4 | Z3 | X3 | Y3 | X3 | Y3 |
| Z3 | Y3 | X3 | Y5 | Y5 | Z3 | X5 | Y5 | Z4 | Y5 | X5 | Z3 | Y5 | Y5 | X3 | Y3 | Z3 |
| Y3 | X3 | Y3 | X3 | Z3 | X4 | Y4 | X5 | Y5 | X5 | Y4 | X4 | Z3 | X3 | Y3 | X3 | Y3 |
| Z3 | Y3 | X3 | Z3 | X3 | Z3 | X5 | Y4 | X5 | Y4 | X5 | Z3 | X3 | Z3 | X3 | Y3 | Z3 |
| Y3 | X3 | Z3 | X3 | Z3 | Y3 | Z3 | X4 | Z3 | X4 | Z3 | Y3 | Z3 | X3 | Z3 | X3 | Y3 |
|    | Y3 | X3 | Y3 | X4 | Z3 | X3 | Z3 | Y5 | Z3 | X3 | Z3 | X4 | Y3 | X3 | Y3 |
|    | Z4 | Y3 | X3 | Y3 | X3 | Z3 | X3 | Y5 | X3 | Z3 | X3 | Y3 | X3 | Y3 | Z4 |
|    |    | Y4 | Y3 | X3 | Z3 | X3 | Y3 | X3 | Y3 | X3 | Z3 | X3 | Y3 | Y4 |
|    |    |    | Z4 | Y3 | X3 | Y3 | X3 | Y3 | X3 | Y3 | X3 | Y3 | Z4 |
|    |    |    |    | Y3 | Z3 | Y3 | Z3 | Y3 | Z3 | Y3 |    |    |    |

MOX FUEL ARRANGEMENT FOR NUCLEAR CORE

This application is a divisional of application Ser. No. 09/083,442 filed May 22, 1998 and a continuation of application Ser. No. 08/749,795 filed Nov. 15, 1996 now U.S. Pat. No. 5,822,388.

BACKGROUND OF THE INVENTION

1. Field of the Invention

The present invention relates to a nuclear reactor core arrangement. More particularly, this invention relates to a nuclear reactor core arrangement which is adapted to combust plutonium along with uranium fuels and which utilizes a plurality of fuel assemblies that include mixed-oxide (MOX) fuel rods.

2. Discussion of the Related Art

The Department of Energy (DOE) has a large excess of plutonium resulting from the retirement of nuclear weapons and is considering options for its disposal. One option recommended by the National Academy of Sciences (NAS) for the disposal of the excess weapons-grade plutonium is conversion to spent fuel. In this approach, the excess weapons plutonium is converted to plutonium oxide ($PuO_2$) and used in a mixed oxide ($PuO_2$—$UO_2$) form without reprocessing as fuel for existing nuclear reactors. This results in a spent fuel form which is "proliferation resistant" and that meets the "spent fuel standard" which is recommended by the NAS and which is being used by the DOE.

However, this mixed oxide (MOX) approach requires: 1) conservative, realistic core performance characteristics which are similar to those for current uranium core designs; 2) that the technique minimize licensing risks by avoiding any erosion of safety margins compared to those for currently licensed conventional uranium core designs; 3) that impacts on plant operation be minimized or totally avoided; and 4) that the energy extracted from the MOX fuel be maximized, thus providing the best economics.

Accordingly, ground rules were established by the DOE in light of the above objective. Namely, it is required that:

There is no mixing of MOX and burnable absorber in the same fuel rod. This allows manufacture of lead test assemblies in existing European MOX fuel fabrication facilities.

The fuel and core designs are developed using existing fuel and core design methodologies.

The equilibrium cycle core design characteristics using MOX matches current uranium oxide ($UO_2$) reload core design characteristics as much as possible.

The cycle length of the MOX core design is essentially the same as that of the $UO_2$ core design.

There is no significant (if any) plant modifications necessary.

There is no significant impact on plant systems or operation.

Plant parameters should remain within existing plant technical specifications to the greatest extent possible.

Accordingly, there exists a need for a nuclear core arrangement which can used in existing facilities and which enables an acceptably high throughput of plutonium in the form of MOX, while remaining within the above constraints.

SUMMARY OF THE INVENTION

Accordingly, an object of the present invention is to provide a novel core design that allows the use of mixed oxide (MOX) fuel containing weapons-grade plutonium in an existing nuclear reactor.

Another object of the present invention is to provide a novel reload core design that enables the disposal of a large quantity of weapons-grade material in existing nuclear reactors with no significant plant modifications or impact on plant systems or plant operation.

Another object of the present invention is to provide novel core designs for pressurized water reactor which uses MOX fuel, which maximizes the loading and throughput of weapons-grade plutonium and which is capable of disposing of a predetermined amount of weapons-grade plutonium in a given number of years of plant operation.

Another object of the present invention is to provide a novel reload MOX core design that has essentially the same cycle length and combustion characteristics as existing $UO_2$ core designs.

Another object of the present invention is to provide a novel core design that would ensure that fuel assemblies can be manufactured in existing MOX fuel fabrication facilities and meet the requirement that the MOX and a burnable absorber are not present in the same fuel rod.

Another object of the present invention is to provide a novel reload MOX core design that will allow plant parameters to remain within the existing plant technical specifications to the greatest extent possible.

In brief, in order to achieve the above objects and to use up the above mentioned stockpile of weapons-grade plutonium, the plutonium is converted into a mixed oxide (MOX) fuel form wherein it can be disposed in a plurality of different fuel assembly designs. Depending on the equilibrium cycle that is required, a predetermined number of one or more of the fuel assembly types is selected and arranged in the core of the reactor in accordance with a selected loading schedule. Each of the fuel assemblies is designed to produce different combustion characteristics whereby the appropriate selection and disposition in the core enables the resulting equilibrium cycle to closely resemble that which is produced using conventional urania fuel. The arrangement of the MOX fuel and burnable absorber rods within each of the fuel assemblies, in combination with a selective control of the amount of plutonium which is contained in each of the MOX rods, is used to tailor the combustion characteristics of the assembly.

More specifically, a first aspect of the invention resides in a fuel assembly for use in a nuclear reactor comprising: a plurality of MOX fuel rods; and a plurality of burnable absorber rods; each of the MOX fuel rods and each of the burnable absorber rods being disposed at a predetermined location within the fuel rod assembly.

A second aspect of the invention resides in an equilibrium cycle core arrangement of a nuclear reactor comprising: a plurality of fuel assembly types, each type comprising: a plurality of MOX fuel rods, and a plurality of burnable absorber rods, each of the MOX fuel rods and each of the absorber rods being disposed at a predetermined location within a rod matrix for that type; wherein each fuel assembly type has a different number of MOX fuel rods and burnable absorber rods, respectively.

A further aspect of the invention resides in a nuclear reactor core comprising a first predetermined number of mixed oxide (MOX) fuel assemblies which are arranged in a predetermined pattern in the core; each of the fuel assemblies being selected from a plurality of different fuel assembly designs wherein the MOX fuel is arranged differently and which, when arranged in the predetermined pattern, combust to produce an equilibrium cycle which is essentially the same as an equilibrium cycle produced using fuel assemblies containing only urania fuel.

Another aspect of the invention comes in a method of fueling a nuclear reactor comprising the steps of: loading a first group of fresh unburnt MOX fuel rod assemblies into a first set of predetermined positions in a core of the reactor, in accordance with a predetermined location schedule; loading a second group of MOX fuel rod assemblies which have been burned once, into a second set of predetermined positions which are selectively arranged in the core with respect to the first set of predetermined positions, in accordance with the predetermined location schedule; and loading a third group of MOX fuel rod assemblies which have been burned twice, into a third set of predetermined positions which are selectively arranged in the core with respect to the first and second set of predetermined positions, in accordance with the predetermined location schedule.

An important feature of the above method comes in the step of selecting the first group of fuel rod assemblies so as to comprise one or more of a plurality of predetermined octantly symmetrical assembly designs which each contain different amounts of plutonium and/or wherein the plutonium is distributed between the fuel rods of the assembly in a manner wherein an equilibrium cycle for the core exhibits a predetermined relationship with a predetermined equilibrium cycle produced using urania fuel.

Another important feature of the above method comes in the step of distributing the amount of plutonium which is contained in the fuel rods of each of the plurality of octantly symmetrical assembly designs in accordance with a plurality of predetermined distribution schedules.

Yet another aspect of the invention resides in a nuclear reactor core comprising: a first group of fresh MOX fuel rod assemblies which are unburnt and which are loaded into a first set of predetermined positions in the core, in accordance with a predetermined location schedule; a second group of MOX fuel rod assemblies which have been burned once, and which are loaded into a second set of predetermined positions which are selectively arranged in the core with respect to the first set of predetermined positions, in accordance with the predetermined location schedule; and a third group of MOX fuel rods assemblies which have been burned twice, and which are loaded into a third set of predetermined positions which are selectively arranged in the core with respect to the first and second set of predetermined positions, in accordance with the predetermined location schedule.

An important feature of the above structure comes in that the first group of fuel rod assemblies comprise one or more of a plurality of predetermined octantly symmetrical assembly designs which each contain different amounts of plutonium, and so that an equilibrium cycle for the core exhibits a predetermined relationship with a predetermined equilibrium cycle produced using urania fuel.

A further important feature of the above structure comes in that the amount of plutonium, which is contained in the fuel rods of each of the plurality of octantly symmetrical assembly designs, is distributed in accordance with a respective plurality of predetermined distribution schedules.

BRIEF DESCRIPTION OF THE DRAWINGS

The present invention will become more clearly appreciated as the disclosure of the present invention is made with reference to the accompanying drawings wherein:

FIGS. 2A and 2B are views showing four and twelve element control element assemblies which can be used in conjunction with the fuel rod array depicted in FIG. 1;

FIG. 5A is a diagram schematically depicting a 16×16 MOX fuel assembly design according to the present instant invention which includes .24 erbium ($UO_2$—$Er_2O_3$) rods;

FIG. 5B is a low enrichment octant map of the MOX fuel assembly design of FIG. 5A;

FIG. 5C is a high enrichment octant map of the MOX fuel assembly design of FIG. 5A;

FIG. 6A shows a 16×16 MOX fuel assembly design according to the present invention which includes 32 erbium ($UO_2$—$Er_2O_3$) rods;

FIG. 6B is a low enrichment octant map of the MOX fuel assembly design of FIG. 6A;

FIG. 6C is a high enrichment octant map of the MOX fuel assembly design of FIG. 6A;

FIG. 7A shows a 16×16 MOX fuel assembly design of the instant invention which includes 40 erbium ($UO_2$—$Er_2O_3$) rods;

FIG. 7B is a low enrichment octant map of the MOX fuel assembly design of FIG. 7A;

FIG. 7C is a high enrichment octant map of the MOX fuel assembly design of FIG. 7A;

FIG. 8A shows a 16×16 MOX fuel assembly design of the instant invention having 48 erbium ($UO_2$—$Er_2O_3$) rods;

FIG. 8B is a low enrichment octant map of the MOX fuel assembly design of FIG. 8A;

FIG. 8C is a high enrichment octant map of the MOX fuel assembly design of FIG. 8A;

FIG. 9A shows a 16×16 MOX fuel assembly design of the instant invention including 56 erbium ($UO_2$—$Er_2O_3$) rods;

FIG. 9B is a low enrichment octant map of the MOX fuel assembly design of FIG. 9A;

FIG. 9C is a high enrichment octant map of the MOX fuel assembly design of FIG. 9A;

FIG. 10A shows a 16×16 MOX fuel assembly design of the instant including 60 erbium ($UO_2$—$Er_2O_3$) rods;

FIG. 10B is a low enrichment octant map of the MOX fuel assembly design of FIG. 10A;

FIG. 10C is a high enrichment octant map of the MOX fuel assembly design of FIG. 10A;

FIG. 11A shows a 16×16 MOX fuel assembly design of the instant invention which includes 64 erbium ($UO_2$—$Er_2O_3$) rods;

FIG. 11B is a low enrichment octant map of the MOX fuel assembly design of FIG. 11A;

FIG. 11C is a high enrichment octant map of the MOX fuel assembly design of FIG. 11A;

FIG. 12A shows a 16×16 MOX fuel assembly design including 72 erbium ($UO_2$—$Er_2O_3$) rods;

FIG. 12B is a low enrichment octant map of the MOX fuel assembly design of FIG. 12A;

FIG. 12C is a high enrichment octant map of the MOX fuel assembly design of FIG. 12A;

FIG. 13A shows a 16×16 MOX fuel assembly design of the instant invention including 80 erbium ($UO_2$—$Er_2O_3$) rods;

FIG. 13B is a low enrichment octant map of the MOX fuel assembly design of FIG. 13A;

FIG. 13C is a high enrichment octant map of the MOX fuel assembly design of FIG. 13A;

FIG. 14A shows a 16×16 MOX fuel assembly design of the instant invention including 88 erbium ($UO_2$—$Er_2O_3$) rods;

FIG. 14B is a low enrichment octant map of the MOX fuel assembly design of FIG. 14A;

FIG. 14C is a high enrichment octant map of the MOX fuel assembly design of FIG. 14A;

FIG. 15 is a diagram showing a MOX equilibrium cycle loading pattern design wherein an 81 assembly feed batch is used;

FIG. 16 is a diagram showing a second example of a MOX equilibrium cycle loading pattern or schedule wherein an 81 assembly feed batch is used; and FIG. 17 shows the MOX equilibrium cycle loading pattern or schedule of the instant invention wherein an 88 assembly feed batch is used.

DETAILED DESCRIPTION OF THE PREFERRED EMBODIMENTS

One conventional type of nuclear reactor in which the MOX fuel can be utilized is the pressurized water reactor (PWR). This type of reactor typically combusts a uranium oxide ($UO_2$) fuel to produce steam. These NSSS (nuclear steam supply systems) traditionally include two-loop arrangement with two steam generators, two hot legs, and four cold legs each with a reactor coolant pump.

Figure 1:
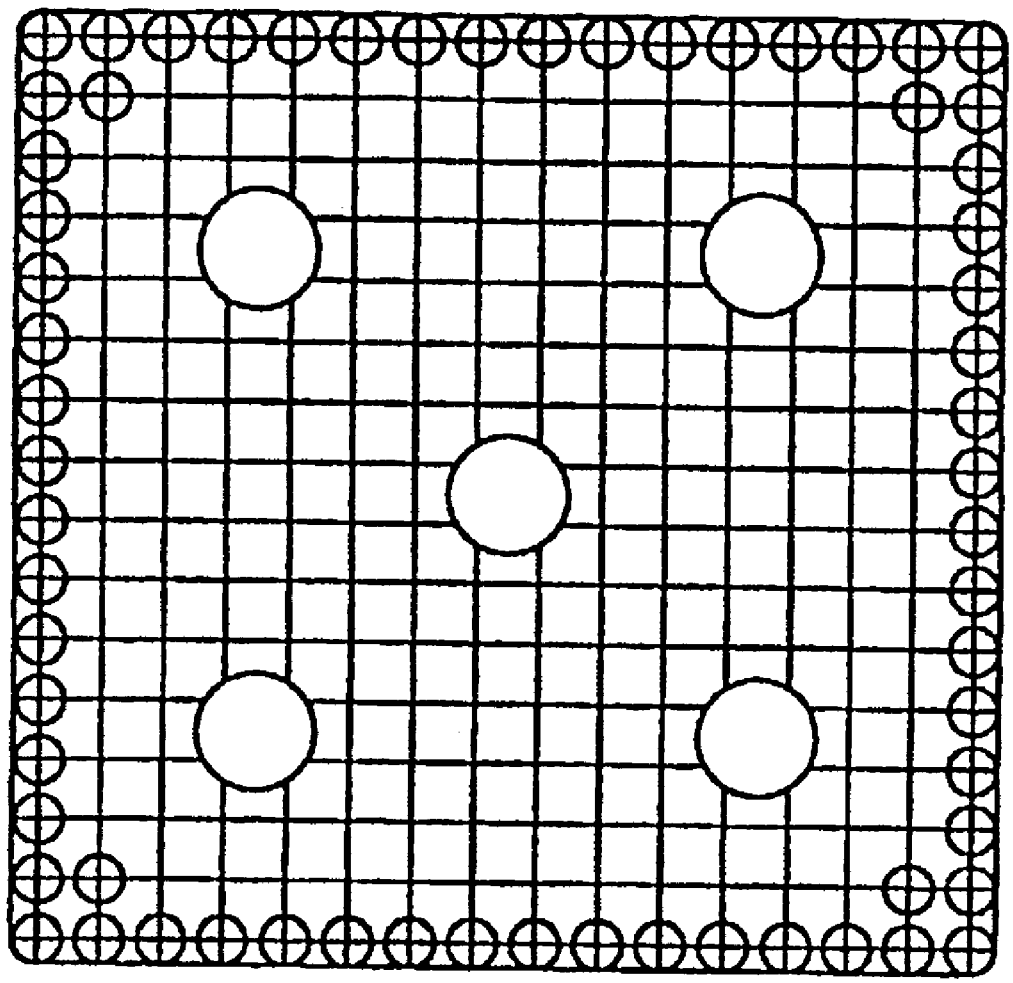
FIG. 1 is a view depicting a 16×16 fuel rod array.

One specific example of a PWR in which the embodiments of the invention can be implemented is ABB Combustion Engineering's System 80® reactor which loads 241 fuel assemblies. Each assembly, as seen in FIG. 1, is mechanically identical to the others and consists of a 16×16 fuel rod array 20 with five large structural guide tubes 21 that each occupy 2×2 fuel lattice locations. The four outer guide tubes are for control element assembly (CEA) fingers, while the center guide tube is used for in-core instrumentation. The in-core instruments are bottom-entry, and therefore do not interfere with the upper internal design for CEA guidance. Each fuel assembly contains 236 fuel rods 22.

Figure 3:
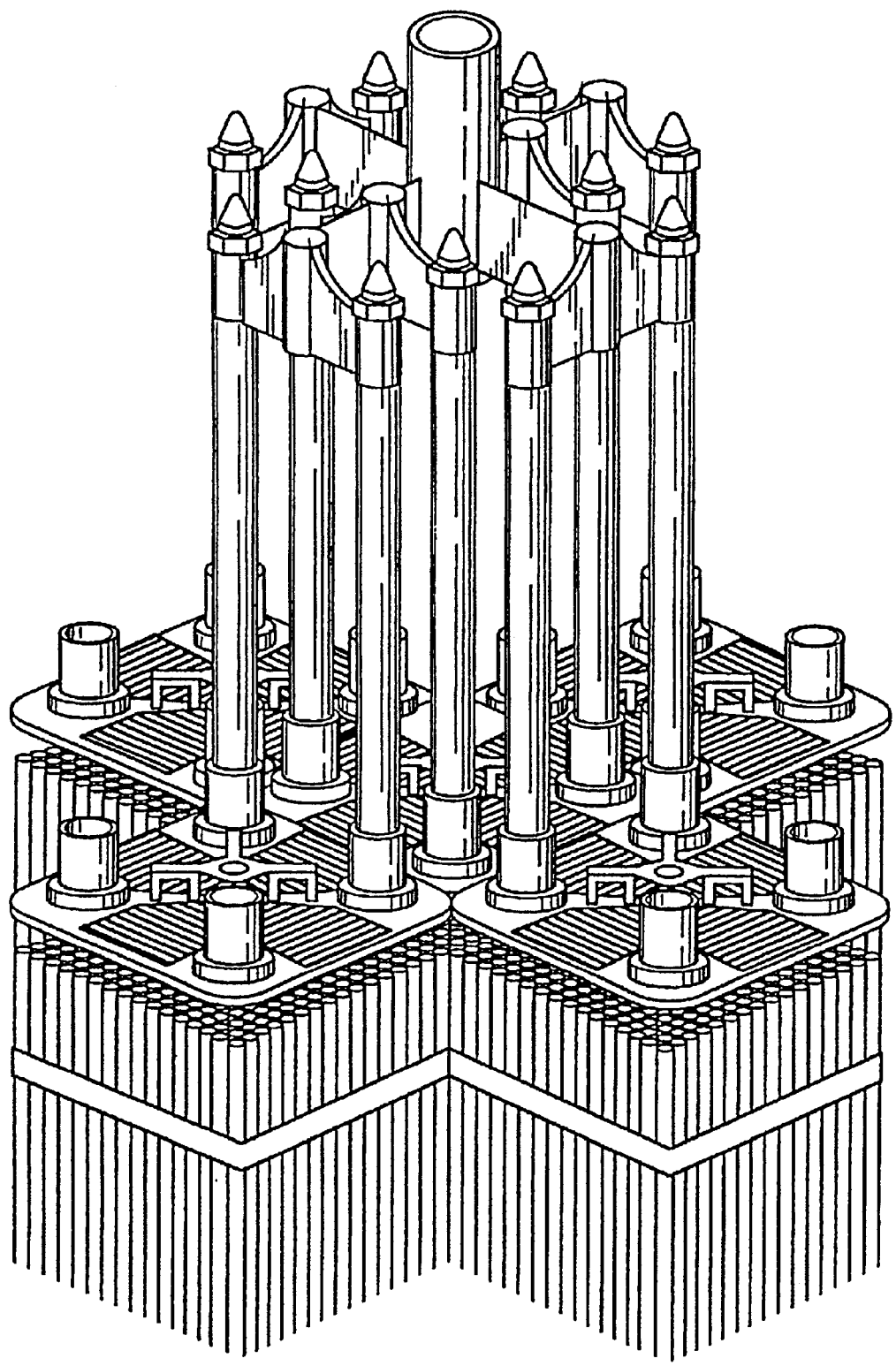
FIG. 3 shows a twelve element control element assembly operatively arranged with five fuel assemblies.
Figure 4:
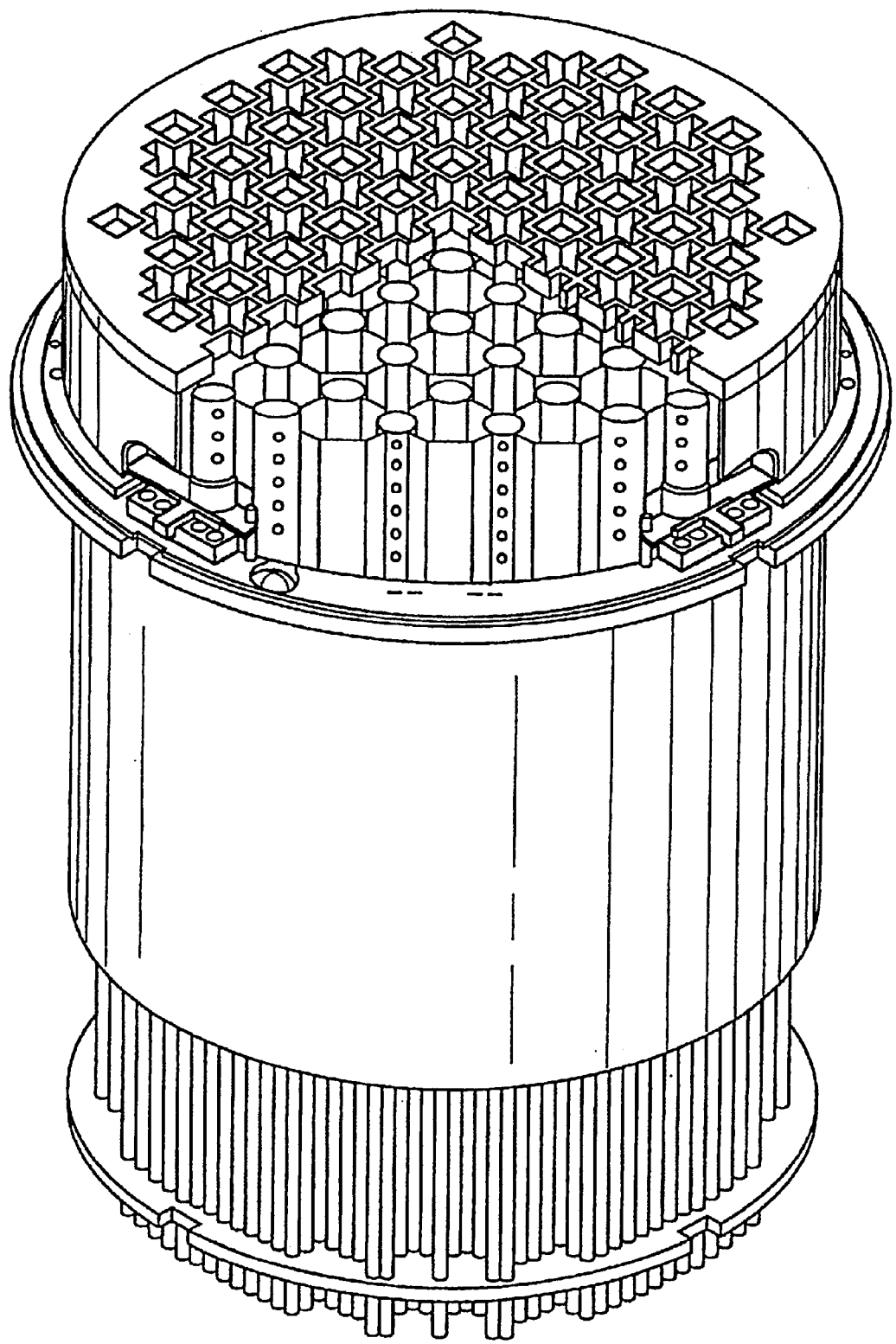
FIG. 4 is a perspective view showing of an upper guide structure design assembly.

As seen in FIG. 2, the CEA's have either 4 or 12 element arrangements. The 12 element CEA has the unique characteristic of inserting into five adjacent fuel assemblies, as shown in FIG. 3. This characteristic is made possible by the unique upper guide structure design. of the reactor internals, which provide continuous guidance for each individual CEA element into the fuel assembly guide tube. This upper guide structure, shown in FIG. 4, is a rugged, all-welded structure, and protects each individual CEA element from flow forces and dynamic loads.

In this $UO_2$ core design, burnable absorber pins which contain erbia ($Er_2O_3$) admixed with enriched $UO_2$ are used in the fuel assemblies. These burnable fuel rods are located in predetermined locations to provide reactivity hold down and control power peaking.

Reference will now be made in detail to the preferred embodiments of the invention, examples of which are illustrated in the accompanying drawings.

FIGS. 5A to 14A show ten different 16×16 fuel assembly designs containing MOX fuel which were developed for use in the equilibrium cycle core designs of the above mentioned type of nuclear reactor. According to the invention, it is possible to select a number (e.g. 241) of one or more of the these fuel assembly designs and to compile the core in a manner which will enable a particular set of combustion characteristics, such as produced by using only conventional uranium fuel, to be replicated.

Burnable absorber rods containing erbia are incorporated into these MOX fuel assembly designs to provide reactivity hold down and control power peaking. These are fuel-bearing burnable absorbers, but do not contain MOX in accordance with the above mentioned ground rules/restraints which have been imposed. Instead, the burnable absorber rods employed in these MOX assemblies are, in the disclosed embodiments, an admixture of erbia and enriched $UO_2$, and are functionally identical to the burnable absorber pins described earlier in the discussion of the traditional $UO_2$ core design.

The fuel assembly designs in FIGS. 5 to 14 are differentiated by the number of MOX fuel rods and the number of urania-erbia ($UO_2$—$Er_2O_3$) rods within each assembly as well as by the specific arrangement of these rods. In FIGS. 5 to 14, "M" represents a MOX fuel rod and "E" represents an urania-erbia fuel rod. The number of urania-erbia rods in the fuel assembly designs in the arrangements shown in FIGS. 5 to 14 ranges from 24 to 88.

Within each fuel assembly design, the locations of the burnable absorber (urania-erbia) rods and the MOX fuel rods are fixed. Both the $UO_2$ enrichment in the urania-erbia rods and the plutonium enrichment (wt % of Pu-239) in the MOX fuel rods can be varied during the core design process. Typically, there are 5 to 8 different plutonium enrichments in the MOX fuel rods within any given fuel assembly. For the urania-erbia rods, the $UO_2$ enrichment is the same in all of the rods within a particular fuel assembly.

Each of the fuel assembly designs in FIGS. 5A to 14A were developed on an octant basis and are octant-symmetric. Each of FIGS. 5B to 14B and 5C to 14C depict, for an assembly octant, the specific Pu-239 enrichment of each MOX fuel rod and the resulting normalized intra-assembly power distribution. Since the enrichment of the burnable absorber rods is fixed within any one of these fuel assembly designs, the respective octant maps in FIGS. 5B to 14B and 5C to 14C identify them within each assembly with the letter "E".

Actually, two such octant maps are depicted for each. assembly design, representing data for a low enrichment case in FIGS. 5B to 14B and a high enrichment case in FIGS. 5C to 14C, respectively. Between these two cases, each fuel pin's enrichment differs by exactly 1.0 wt. % For the MOX pins, the Pu-239 enrichment is as shown. For the erbia pins, a fixed $UO_2$ enrichment of 4.0 wt. % is selected for the low enrichment case and a fixed $UO_2$ enrichment of 5.0 wt. % is selected for the high enrichment case.

Each MOX assembly is designed to provide optimal performance over this range of enrichments represented by the low enrichment case and the high enrichment case. Detailed neutronics, generated for both cases, indicates that the neutronics behavior is characterized as a function of fuel enrichment. This design approach makes it possible to consider the effects of varying assembly enrichments during an equilibrium cycle core design phase without the need of re-generating any additional assembly data.

By using different fuel rod enrichments within each MOX fuel assembly as described herein and as shown in the corresponding figures, it is possible to both optimize the intra-assembly power peaking, which enhances the performance of the fuel assemblies during operation, and to maximize the throughput of weapons-grade plutonium in each core. The burner absorber rod characteristics for the MOX assembly designs are also arranged to optimize the intra-assembly power peaking and have the secondary benefit of enhancing the throughput of weapons-grade plutonium in each core.

Figure 5A:
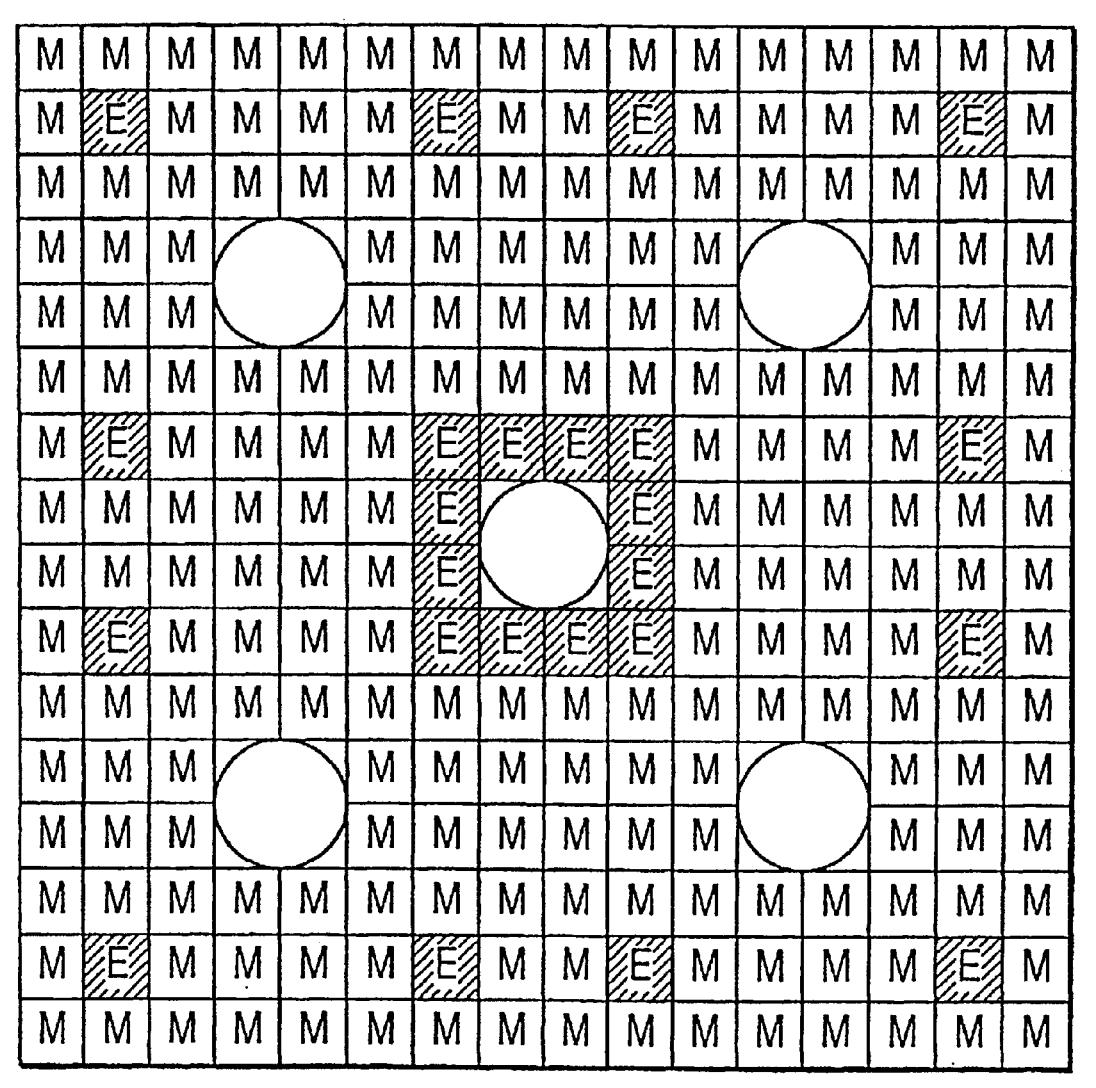

FIG. 5A shows the MOX fuel assembly design of a first embodiment of the instant invention having a 16×16 fuel rod array including 24 erbium ($UO_2$—$Er_2O_3$) rods. FIG. 5B shows a low enrichment octant map and FIG. 5C shows a high enrichment octant map of this embodiment. Each of these maps depicts one octant of the 236 rod arrangement shown in FIG. 5A. As will be noted, in the case of the low enrichment, while most of the MOX rods have a Pu-239 enrichment of 4.8wt %, a number of the rods, which are in proximity of the guide tubes 21, have lower values which are as low as 3.3wt %. The corresponding MOX rods according to the high enrichment schedule are, as mentioned above, 1% richer.

Figure 6A:
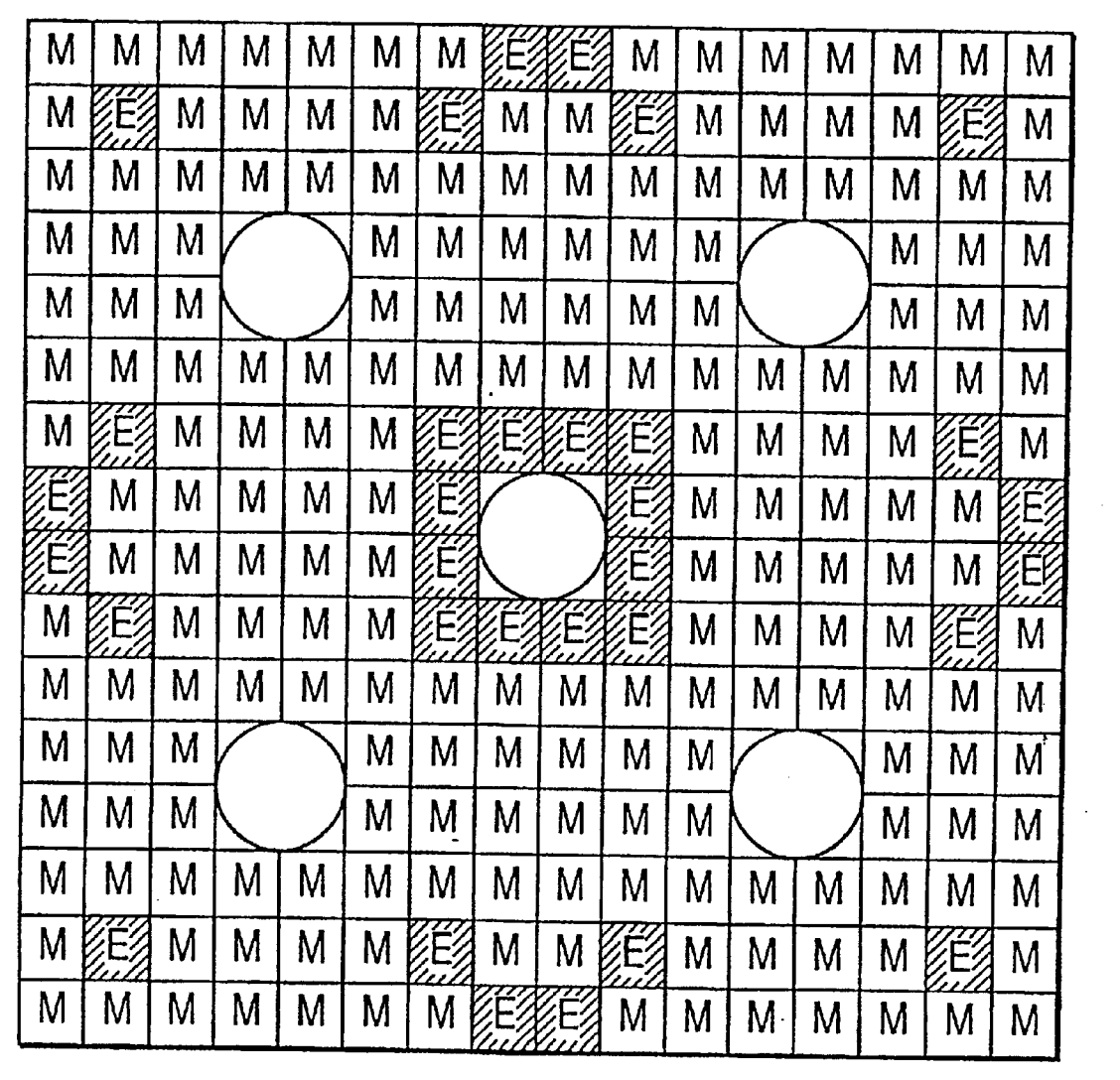

FIG. 6A shows the MOX fuel assembly design according to a second embodiment of the instant invention and which has a 16×16 fuel rod array including 32 erbium ($UO_2$—$Er_2O_3$) rods. FIG. 6B shows a low enrichment octant map and FIG. 6C shows a high enrichment octant map of this embodiment.

Figure 7A:
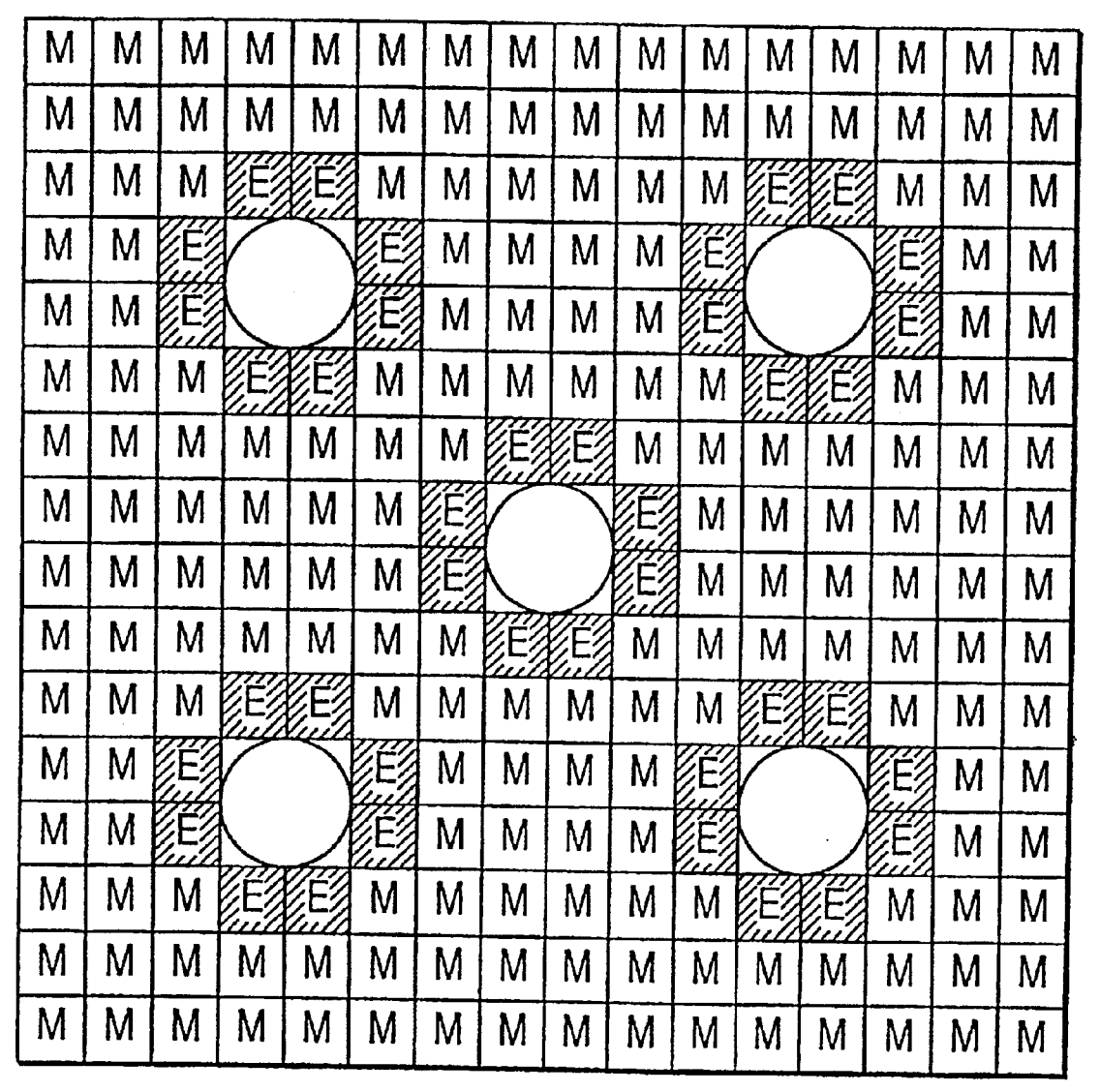

FIG. 7A shows the MOX fuel assembly design of a third embodiment of the instant invention having a 16×16 fuel rod array including 40 erbium ($UO_2$—$Er_2O_3$) rods. FIG. 7B shows a low enrichment octant map and FIG. 7C shows a high enrichment octant map of this embodiment.

Figure 8A:
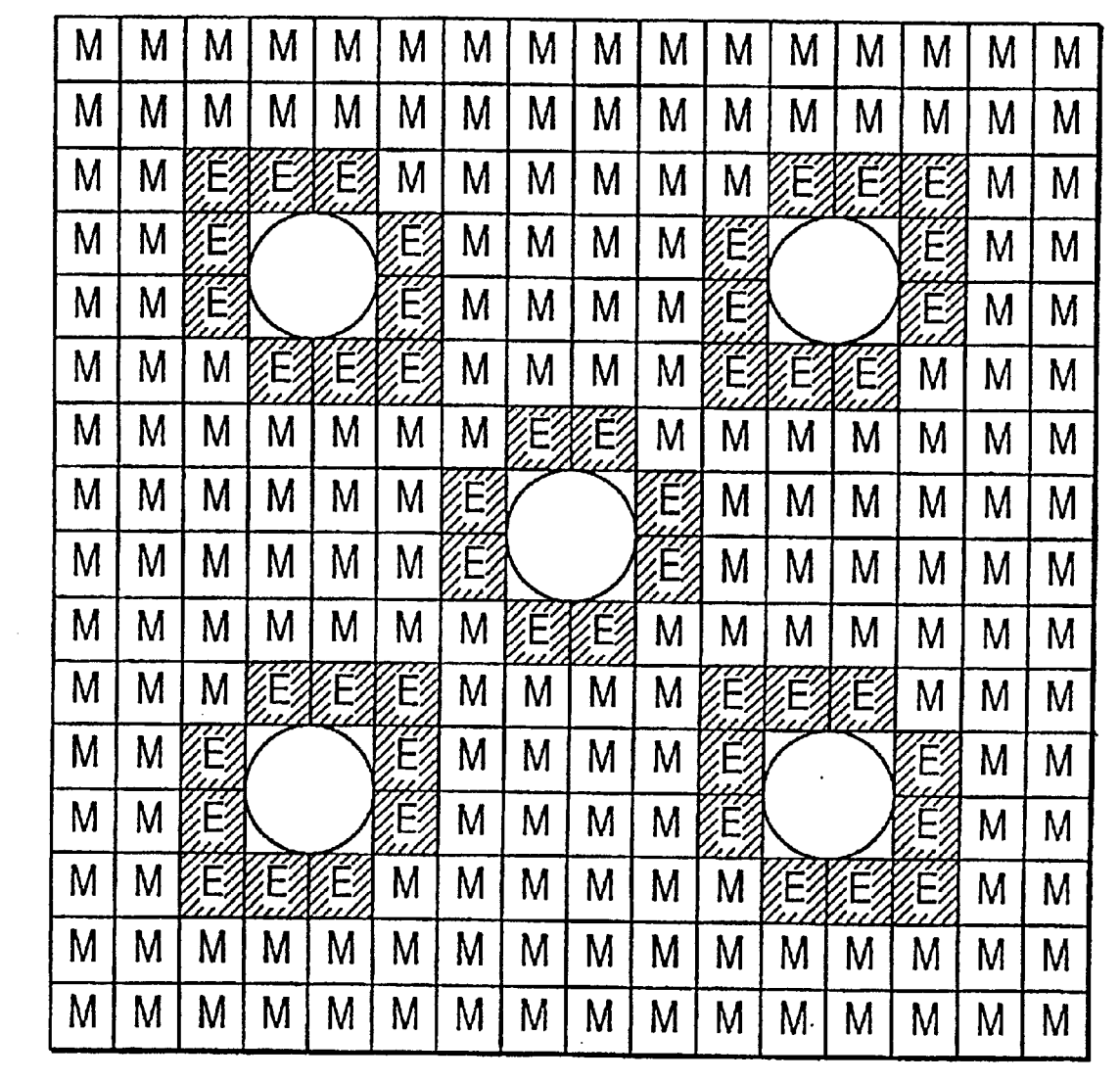

FIG. 8A shows the MOX fuel assembly design of a fourth embodiment of the instant invention having a 16×16 fuel rod array including 48 erbium ($UO_2$—$Er_2O_3$) rods. FIG. 8B shows a low enrichment octant map and FIG. 8C shows a high enrichment octant map of this embodiment.

Figure 9A:
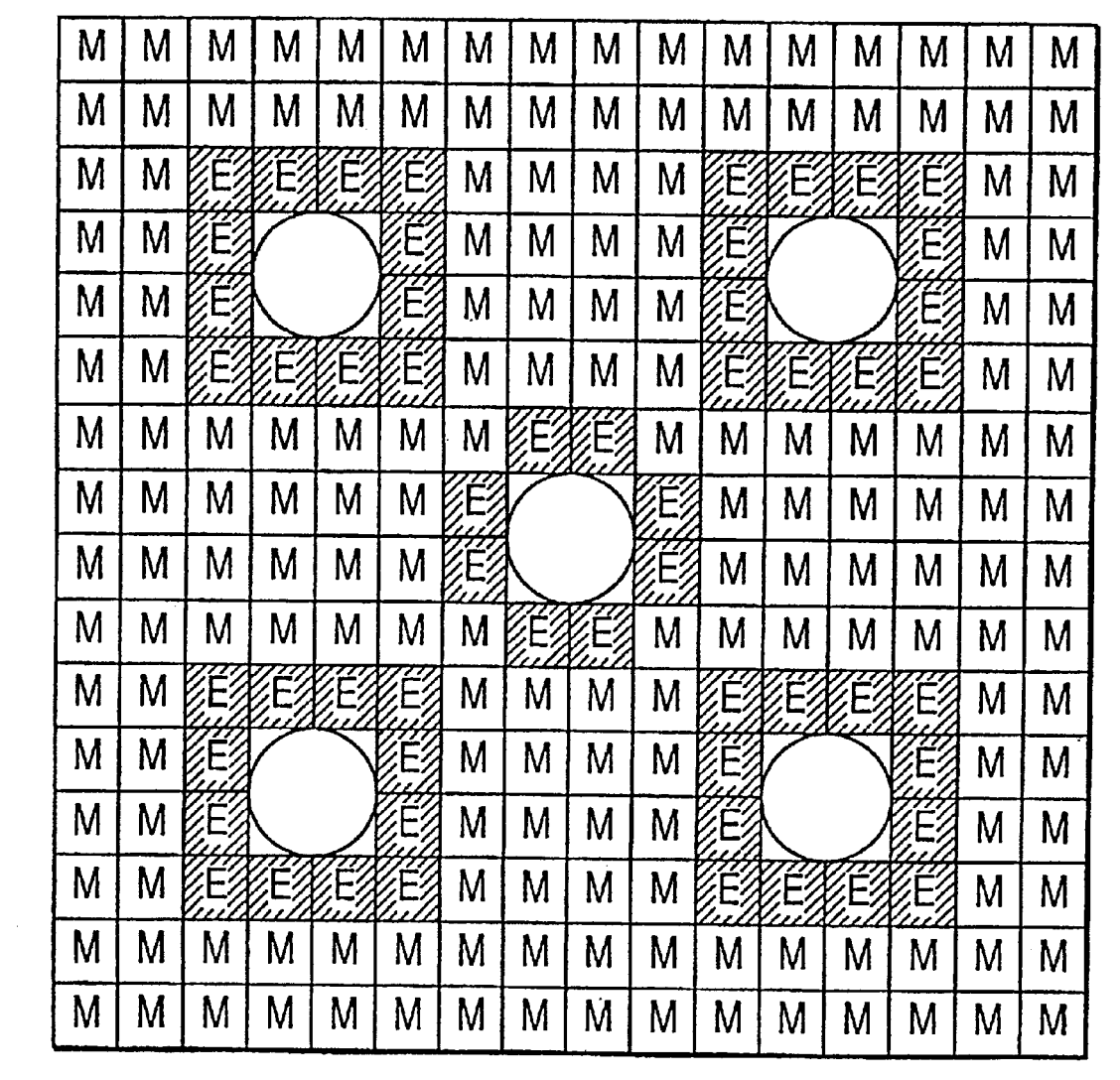

FIG. 9A shows the MOX fuel assembly design of a fifth embodiment of the instant invention having a 16×16 fuel rod array including 56 erbium ($UO_2$—$Er_2O_3$) rods. FIG. 9B shows a low enrichment octant map and FIG. 9C shows a high enrichment octant map of this embodiment.

Figure 10A:
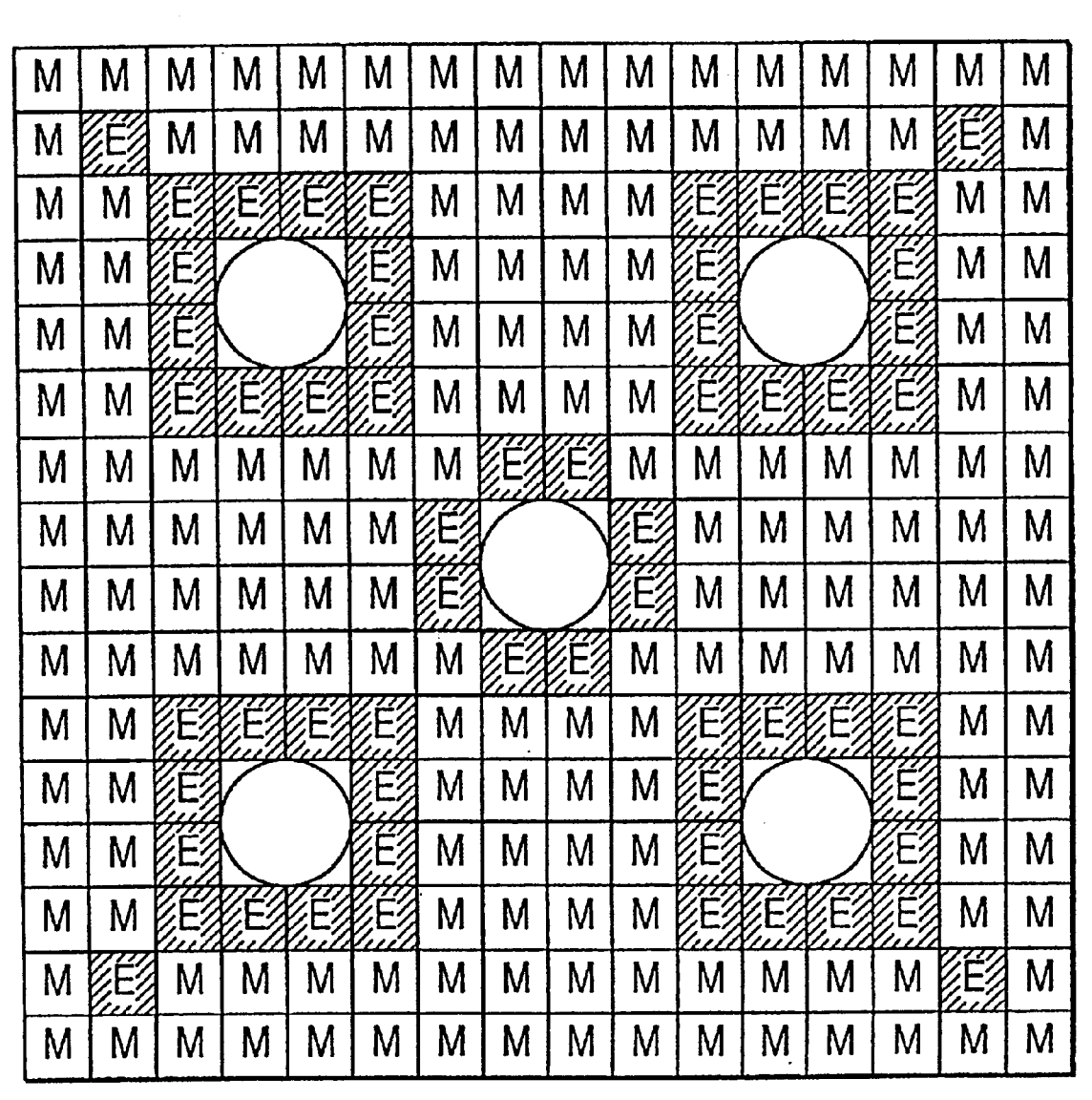

FIG. 10A shows the MOX fuel assembly design of a sixth embodiment of the instant invention having a 16×16 fuel rod array including 60 erbium ($UO_2$—$Er_2O_3$) rods. FIG. 10B shows a low enrichment octant map and FIG. 10C shows a high enrichment octant map of this embodiment.

Figure 11A:
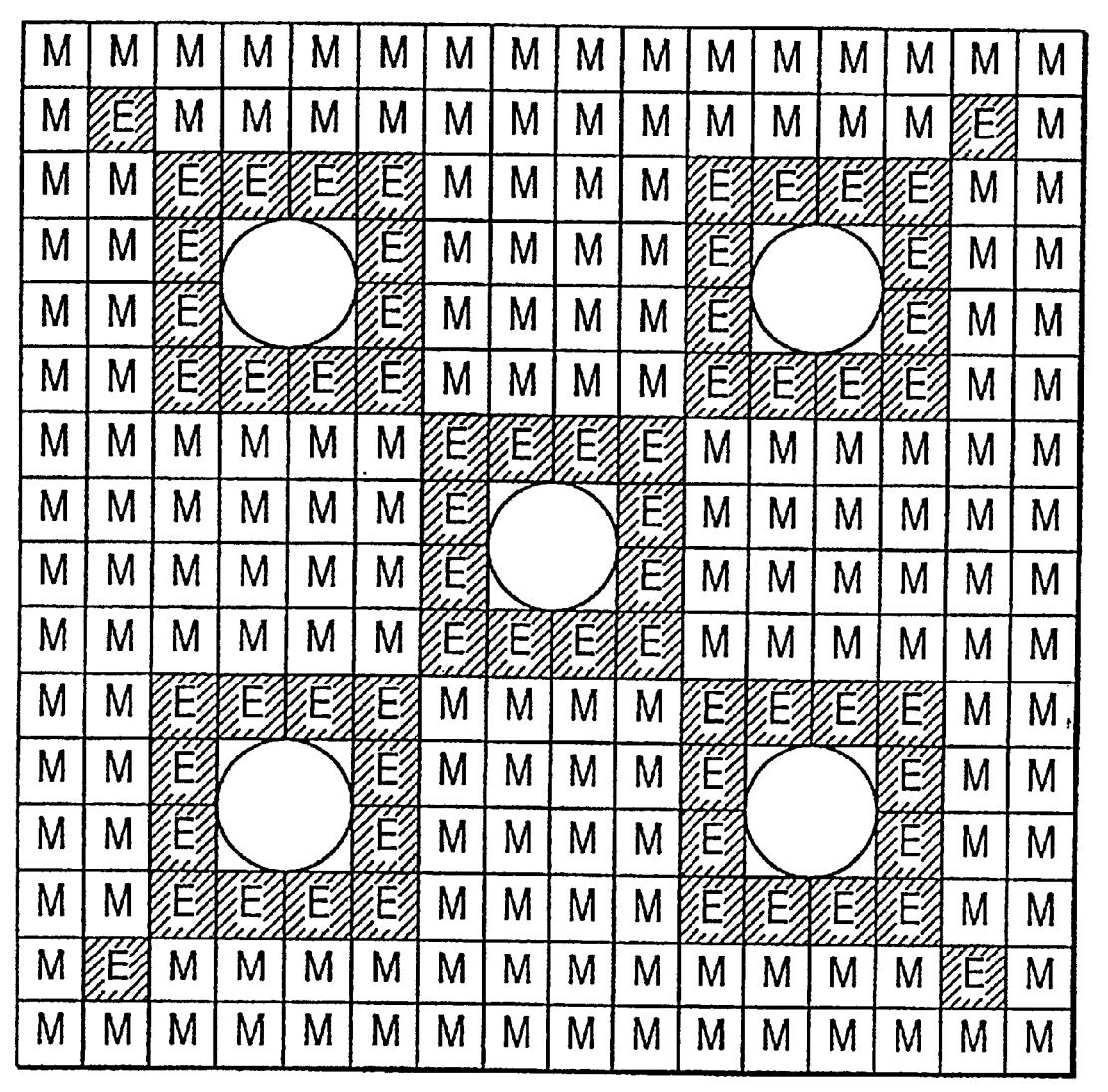

FIG. 11A shows the MOX fuel assembly design of a seventh embodiment of the instant invention having a 16×16 fuel rod array including 64 erbium ($UO_2$—$Er_2O_3$) rods.

FIG. 11B shows a low enrichment octant map and FIG. 11C shows a high enrichment octant map of this embodiment.

Figure 12A:
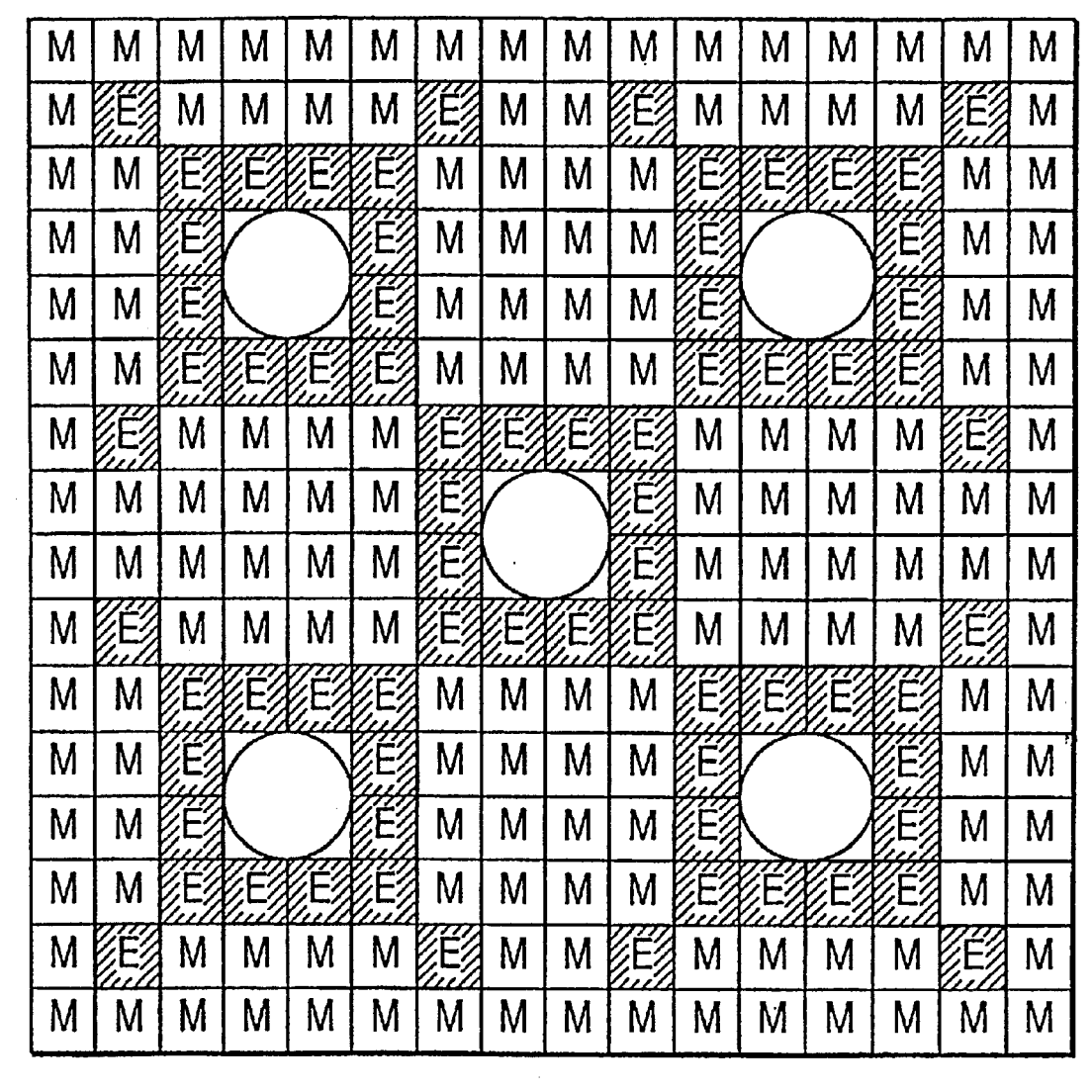

FIG. 12A shows the MOX fuel assembly design of an eighth embodiment of the instant invention having a 16×16 fuel rod array including 72 erbium ($UO_2$—$Er_2O_3$) rods. FIG. 12B shows a low enrichment octant map and FIG. 12C shows a high enrichment octant map of this embodiment.

Figure 13A:
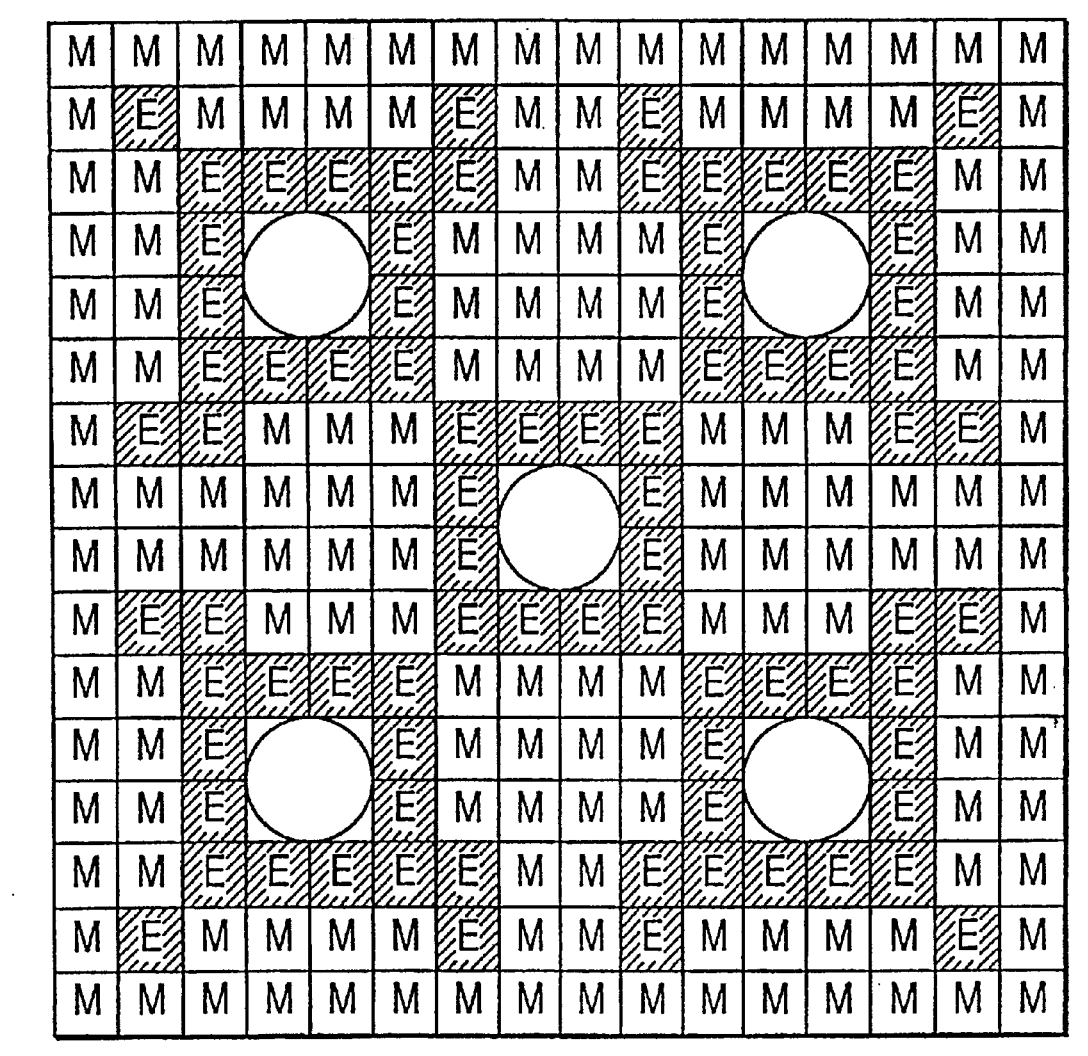

FIG. 13A shows the MOX fuel assembly design of a ninth embodiment of the instant invention having a 16×16 fuel rod array including 80 erbium ($UO_2$—$Er_2O_3$) rods. FIG. 13B shows a low enrichment octant map and FIG. 13C shows a high enrichment octant map of this embodiment.

Figure 14A:
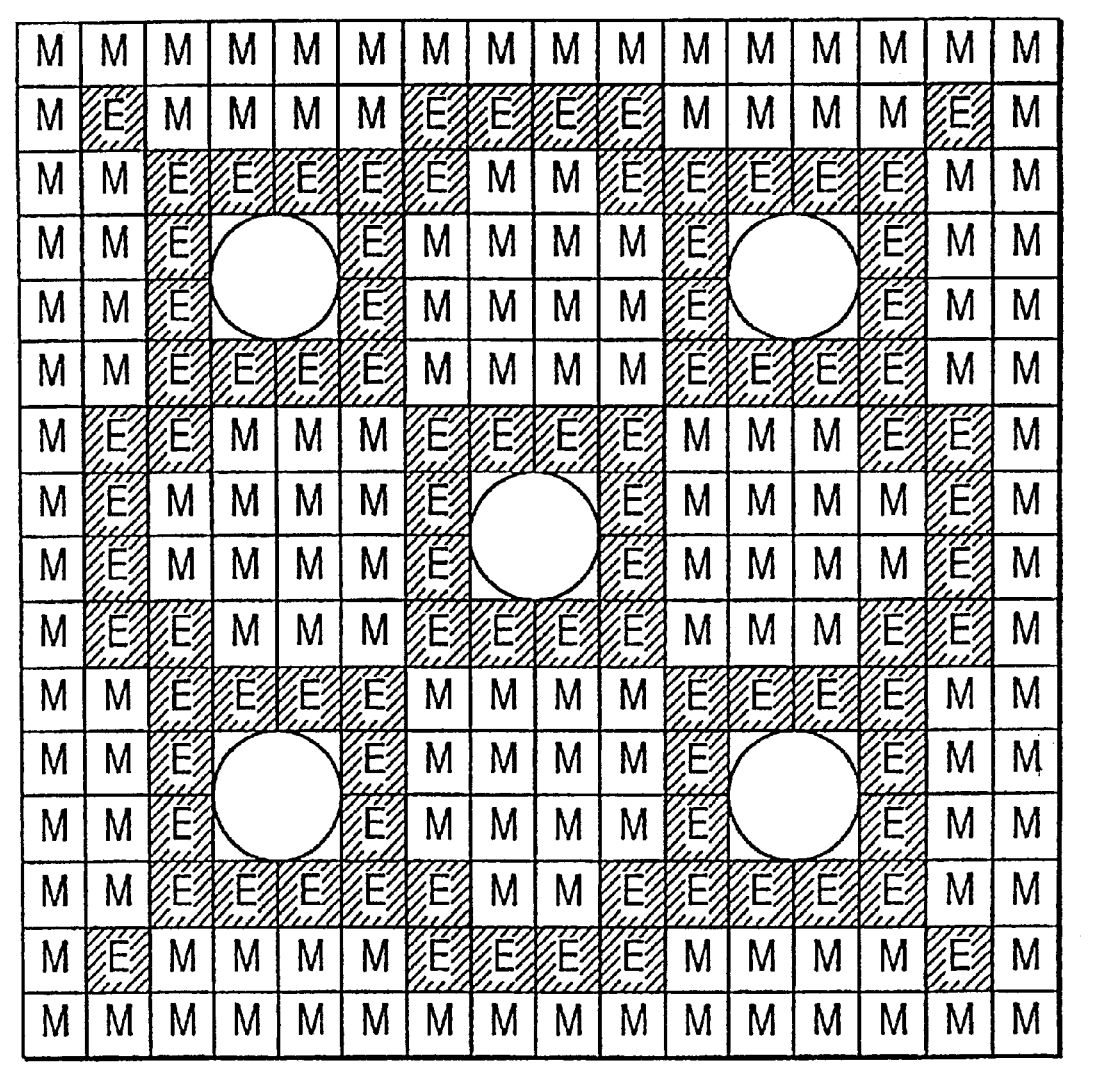

FIG. 14A shows the MOX fuel assembly design of a tenth embodiment of the instant invention having a 16×16 fuel rod array including 88 erbium ($UO_2$—$Er_2O_3$) rods. FIG. 14B shows a low enrichment octant map and FIG. 14C shows a high enrichment octant map of this embodiment.

In accordance with the invention, equilibrium cycle core designs using MOX fuel can be developed using a subset consisting of any combination (e.g. up to three) of the ten fuel assembly designs shown in FIGS. 5A to 14A. FIGS. 15 and 16 show examples of two different equilibrium cycle core loading patterns having a feed batch size of 81 fuel assemblies (i.e. 81 new fuel assemblies). FIG. 17 shows an equilibrium cycle core loading pattern having a feed batch size of 88 fuel assemblies.

In FIGS. 15 to 17, "X" represents a fresh assembly, "Y" represents a once-burned assembly and "Z" represents a twice-burned assembly, "O" represents an assembly sub-type with 24 $UO_2$—$Er_2O_3$ fuel rods, "3" represents an assembly sub-type with 48 $UO_2$—$Er_2O_3$ fuel rods, "4" represents an assembly sub-type with 56 $UO_2$—$Er_2O_3$ fuel rods, "5" represents an assembly sub-type with 60 $UO_2$—$Er_2O_3$ fuel rods and "7" represents an assembly sub-type with 72 $UO_2$—$Er_2O_3$ fuel rods. FIG. 15 shows a feed batch having 25 assemblies with 24 $UO_2$—$Er_2O_3$ fuel rods and 56 assemblies with 56 $UO_2$—$Er_2O_3$ fuel rods. The average enrichment of MOX fuel rods in this feed batch is 5.16 wt % Pu-239. FIG. 16 shows a second feed batch arrangement having 17 assemblies with 24 $UO_2$—$Er_2O_3$ fuel rods, 36 assemblies with 56 $UO_2$—$Er_2O_3$ fuel rods and 28 assemblies with 72 $UO_2$—$Er_2O_3$ fuel rods. The average enrichment of MOX fuel rods in this feed batch is 5.01 wt % Pu-239. FIG. 17 shows a third feed batch arrangement having 64 assemblies with 48 $UO_2$—$Er_2O_3$ fuel rods, 12 assemblies with 56 $UO_2$—$Er_2O_3$ fuel rods and 12 assemblies with 60 $UO_2$—$Er_2O_3$ fuel rods. The average enrichment of MOX fuel rods in this feed batch is 4.67 wt % Pu-239.

A summary of some important design parameters for the equilibrium cycle for a MOX core design and a typical $UO_2$ core design is shown in Table 1 set forth at the end of this disclosure. These equilibrium cycle core designs using MOX fuel were evaluated to assess their performance characteristics relative to a typical $UO_2$ equilibrium cycle core design. As will be appreciated, the invention enabled the MOX core to perform in a manner which closely corresponds to the power level—average coolant temperature series of parameters produced with a $UO_2$ core.

Table 2, which is also set forth at the end of this disclosure, shows a comparison of some important core performance characteristics for the 88 feed batch assembly MOX core design shown in FIG. 17 and a typical 18-month cycle $UO_2$ core design. The core average burn-up for the MOX-based 18-month cycle core design (17,000 MWd/MTHM) is consistent with that for a similar $UO_2$-based cycle (17,500 MWd/MTHM). The maximum fuel rod burn-up is within the licensed limit of 60,000 MWD/MT. The discharge burn-up (46,000 MWd/MTHM) is consistent with discharge burn-ups (45,000 MWd/MTHM) for comparable $UO_2$-based fuel cycles.

The hot full power (HFP) all-rods-out (ARO) BOC critical boron concentration (CBC) for the MOX-based core. design is 1990 ppm, compared to 1250 ppm for a $UO_2$-based core design. Although larger than the value for a typical $UO_2$ core, the HFP BOC CBC for the MOX core is less than the maximum allowable value of 2000 ppm necessary to remain within the existing analysis envelope for existing plants.

The power distributions for the MOX-based core design are similar to those for a comparable $UO_2$-based core design. The maximum expected peaking factors for the MOX core are slightly higher than those for the $UO_2$ core, but within the allowable limits (less than or equal to 1.72 for Fr, 2.00 for Fz, for HFP ARO conditions) necessary to remain within the existing analysis envelope.

The MOX-based equilibrium cycle core designs developed in the instant invention achieve a throughput of approximately 1.5 MT (Metric Tons) of weapons-grade plutonium per 18 month cycle. As a result, the disposal of 50 MT of weapons-grade plutonium could be accomplished in three System 80® reactors in approximately 17 years of plant operation. This includes the transition from a conventional, low enrichment $UO_2$ core to a MOX core.

Numerous modifications and variations of the present invention are possible in light of the above teachings. It is therefore to be understood that within the scope of the appended claims, the invention may be practiced otherwise than as specifically described herein.

For example, as will be self-evident from the above disclosure, if a fuel qualification for MOX fuel wherein the use of erbia in the MOX rods was permitted, a substantial increase in the throughput of plutonium would be enabled with an attendant reduction in the time needed to dispose of any given quantity of weapons grade plutonium.

TABLE 1

Core Design Parameters

|  | $UO_2$ Core | MOX Core |
|---|---|---|
| Power Level | 43876 Mwth | 3876 Mwth |
| Nominal Cycle Length | 18 Months | 18 Months |
|  | ~460 EFPD | 463.5 EFPD |
|  | 17,500 GWd/MTHM | 17,000 GWd/MTHM |
| Fuel Assemblies | 241 | 241 |
| Fuel Assembly Configuration | 16 × 16 | 16 × 16 |
| Fuel Rod Locations/Assembly | 236 | 236 |
| Active Core Height (inches) | 150 | 150 |
| Fuel Loading (MTHM) | 102.3 | 102.3 |
| Fuel Type | Enriched U-235 | Enriched WG $Pu_2O_3$ in Tails $UO_2$, |
| Burnable Absorber Type | $Er_2O_3$ in Enriched $UO_2$ | $Er_2O_3$ in Enriched $UO_2$ |
| Fuel Management | 3-batch, mixed central zone | 3-batch, mixed central zone |
| Erbia Loading | (integral) <2.5 wt % | (integral) <2.5 wt % |
| Feed Batch Size Assemblies | 72–104 | 81–88 |
| Feed Fuel Enrichment | <4.5 wt % U-235 | ~4.5–5.0 wt % Pu-239[1] |
| Soluble Burnable Absorber | Natural $B_{10}$ | Natural $B_{10}$ |
| Control Element Assemblies |  |  |
| Standard Configuration | 76 Full-Length, Full Strength | 76 Full-Length, Full Strength |
|  | 13 Part-Length, Part Strength | 13 Part-Length, Part Strength |
| or |  |  |
| Enhanced Configuration |  | 89 Full-Length, Full Strength |
| Average Heat Generation Rate | 5.45 KW/FT | 5.45 KW/FT |
| Average Coolant Temperature | 585 ° F. | 585 ° F. |

[1]Average for MOX pins only.

TABLE 2

Core Performance Characteristics
System 80 ® Equilibrium Cycle Core Design

|  | $UO_2$ Core | | MOX Core | |
|---|---|---|---|---|
|  | BOC | EOC | BOC | EOC |
| Burnup Data, MWd/MTHM |  |  |  |  |
| Core Average | 13,700 | 31,200 | 17,000 | 34,000 |
| Maximum Fuel Rod | — | 51,600 | — | 57,400 |
| Discharge Batch Average | — | 45,000 | — | 46,400 |
| Critical Boron Data, PPM |  |  |  |  |
| HFP, ARO | 1250 | 1 | 1990 | 90 |
| Inverse Boron Worth, PPM/% Δρ |  |  |  |  |
| Hot Full Power | −130 | −107 | −227 | −169 |
| Maximum Peaking Factors |  |  |  |  |
| Fr (HFP, ARO) | 1.51 |  | 1.64 |  |
| Fq (HFP, ARO) | 1.83 |  | 1.96 |  |
| Moderator Temperature Coefficent (MTC), $10^{-4}$ Δρ/° F. |  |  |  |  |
| Hot Zero Power | +0.17 | — | −1.62 | — |
| Hot Full Power | −0.72 | −2.89 | −1.80 | −3.91 |

TABLE 2-continued

| CEA Worths, % Δρ[1] | Standard CEA Configuration | | Standard CEA Configuration | | Enhanced CEA Configuration | |
|---|---|---|---|---|---|---|
| | Total | Net | Total | Net | Total | Net |
| BOC, HZP | 12.6 | 10.0 | 11.0 | 8.7 | 11.9 | 9.9 |
| EOC, HZP | 15.1 | 11.3 | 13.3 | 10.2 | 14.4 | 11.3 |
| EOC, Cold (68° F.) | 11.1 | 7.5 | 10.2 | 6.7 | 11.1 | 7.7 |

[1]The CEA worths are raw values, with no biases or uncertainties, for comparison purposes only.

What is claimed is:

1. A method of fueling a nuclear reactor comprising:

loading a first group of fresh unburnt MOX fuel rod assemblies into a first set of predetermined positions in a core of the reactor, in accordance with a predetermined location schedule;

loading a second group of MOX fuel rod assemblies which have been burned once, into a second set of predetermined positions which are selectively arranged in the core with respect to the first set of predetermined positions, in accordance with the predetermined location schedule; and loading a third group of MOX fuel rod assemblies which have been burned twice, into a third set of predetermined positions which are selectively arranged in the core with respect to the first and second set of predetermined positions, in accordance with the predetermined location schedule wherein upon completion of loading the core, the core consists essentially of said first, second and third groups, and burnable absorber rods containing urania-erbia.

2. A method of fueling as set forth in claim 1, further comprising the step of selecting the first group of fuel rod assemblies so as to comprise one or more of a plurality of predetermined octantly symmetrical assembly designs which each contain different amounts of plutonium, and so that an equilibrium cycle for the core exhibits a predetermined relationship with a predetermined equilibrium cycle produced using urania fuel.

3. A method of fueling as set forth in claim 2, further comprising the step of distributing the amount of plutonium, which is contained in the fuel rods of each of the plurality of octantly symmetrical assembly designs, in accordance with a plurality of predetermined distribution schedules.

4. A nuclear reactor core consisting essentially of:

a first group of fresh MOX fuel rod assemblies which are unburnt and which are loaded into a first set of predetermined positions in the core, in accordance with a predetermined location schedule;

a second group of MOX fuel rod assemblies which have been burned once, and which are loaded into a second set of predetermined positions which are selectively arranged in the core with respect to the first set of predetermined positions, in accordance with the predetermined location schedule;

a third group of MOX fuel rod assemblies which have been burned twice, and which are loaded into a third set of predetermined positions which are selectively arranged in the core with respect to the first and second set of predetermined positions, in accordance with the predetermined location schedule and burnable absorber rods containing urania-erbia.

5. A nuclear reactor core as set forth in claim 4, wherein the first group of fuel rod assemblies comprise one or more of a plurality of predetermined octantly symmetrical assembly designs which each contain different amounts of plutonium, and are so configured that an equilibrium cycle for the core exhibits a predetermined relationship with a predetermined equilibrium cycle produced using urania fuel.

6. A nuclear reactor as set forth in claim 5, wherein the amount of plutonium which is contained in the fuel rods of each of the plurality of octantly symmetrical assembly designs, is distributed in accordance with a respective plurality of predetermined distribution schedules.

* * * * *